(12) United States Patent
Pimenta et al.

(10) Patent No.: US 12,034,444 B2
(45) Date of Patent: Jul. 9, 2024

(54) CUSTOMIZING A SEMICONDUCTOR PRODUCT

(71) Applicant: AVAGO TECHNOLOGIES INTERNATIONAL SALES PTE. LIMITED, Singapore (SG)

(72) Inventors: Rui Pimenta, Irvine, CA (US); Abbas Saadat, Irvine, CA (US); Jonathan Brett, Irvine, CA (US); Xuemin Chen, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 67 days.

(21) Appl. No.: 17/711,851

(22) Filed: Apr. 1, 2022

(65) Prior Publication Data

US 2023/0318605 A1 Oct. 5, 2023

(51) Int. Cl.
 *H03K 19/0185* (2006.01)
(52) U.S. Cl.
 CPC .......................... *H03K 19/018585* (2013.01)
(58) Field of Classification Search
 None
 See application file for complete search history.

(56) References Cited

U.S. PATENT DOCUMENTS

| | | |
|---|---|---|
| 2009/0102505 A1 | 4/2009 | Anderson et al. |
| 2014/0359755 A1 | 12/2014 | Beitel et al. |
| 2017/0308721 A1 | 10/2017 | Pedersen |

OTHER PUBLICATIONS

Extended European Search Report on EP Appln. 23164651.4 dated Aug. 25, 2008.

*Primary Examiner* — Jany Richardson
(74) *Attorney, Agent, or Firm* — Foley & Lardner LLP

(57) ABSTRACT

A semiconductor product being convertible or converted from a customizable configuration into a selectable or selected one of a plurality of different customized configurations, wherein the semiconductor product comprises a customizing unit configured for customizing the semiconductor product into one of the customized configurations selected by a received customizing data structure specifying a selected application of the semiconductor product, and a plurality of functional blocks each configured for providing an assigned functionality and all being deactivated when the semiconductor product is not in one of the customized configurations, wherein the customizing unit is configured for activating only a subgroup of the functional blocks based on the received customizing data structure.

39 Claims, 9 Drawing Sheets

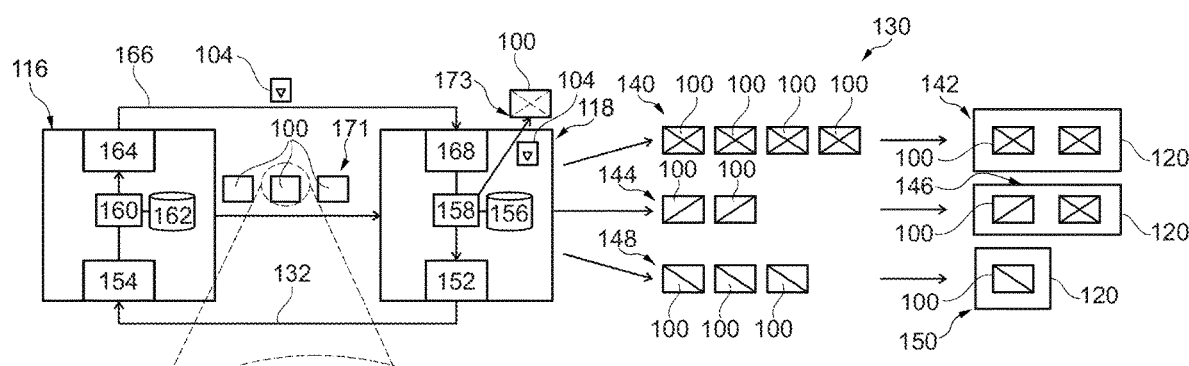
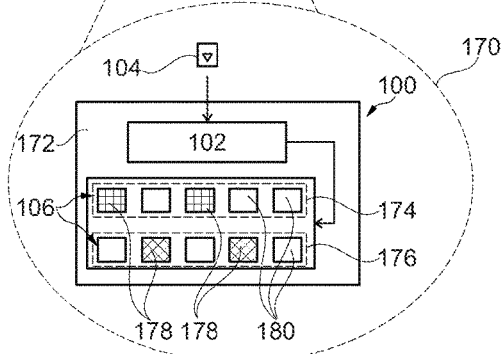
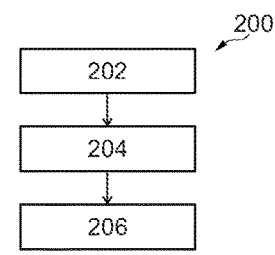
Fig. 2
Fig. 1

CUSTOMIZING A SEMICONDUCTOR PRODUCT

FIELD OF THE DISCLOSURE

This disclosure generally relates to a semiconductor product. Furthermore, this disclosure relates to methods of customizing a security-sensitive semiconductor product. Some embodiments in this disclosure relate to an arrangement for customizing a security-sensitive semiconductor product.

BACKGROUND OF THE DISCLOSURE

Security-sensitive semiconductor products may be delivered in an application-specific ready-to-use configuration. This may lead to complex logistics and inefficient stock keeping. Furthermore, the technical effort for manufacturing semiconductor products for a plurality of different applications may be high. Security against misuse of a plurality of separate kinds of semiconductor products may be a further issue.

BRIEF DESCRIPTION OF THE DRAWINGS

Various objects, aspects, features, and advantages of the disclosure will become more apparent and better understood by referring to the detailed description taken in conjunction with the accompanying drawings. In the drawings, like reference numbers generally indicate identical, functionally similar, and/or structurally similar elements.

FIG. 1 illustrates a flowchart of a method of customizing a security-sensitive semiconductor product according to an exemplary embodiment;

FIG. 2 illustrates an arrangement for customizing a security-sensitive semiconductor product according to an exemplary embodiment;

Figure 3:
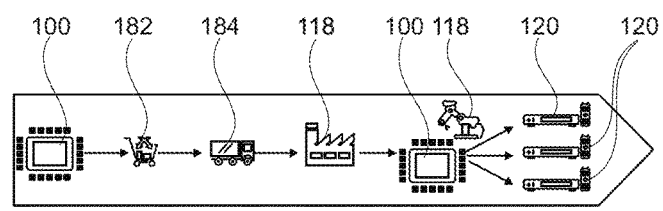
FIG. 3 illustrates a generic supply line according to an exemplary embodiment.

The details of various embodiments of the methods and systems are set forth in the accompanying drawings and the description below.

DETAILED DESCRIPTION

Semiconductor products, such as integrated circuits, processors, or other such hardware is frequently manufactured in application-specific formats, with features included or excluded based on the intended use. With thousands or even millions of potential applications and custom configurations, this may add expense and difficulty to manufacturing, and require separate stock-keeping units (SKUs), assembly or manufacturing lines, and other administrative overhead. Additionally, because features are fixed once the semiconductor product is manufactured, upgrading to add or replace features may require replacement of the semiconductor product and/or the entire device in many instances. For example, a semiconductor product designed for high-speed communications may lack hardware encryption features, and adding such features may require replacing the semiconductor product with a new product incorporating such functions. Similarly, manufacturers may provide multiple versions of products with different capabilities such as computer-aided manufacturing (CAM) machines in entry level and premium models, allowing greater access to the marketplace and customers at different manufacturing scales. However, by requiring different hardware and semiconductor products, it may be impossible for customers to upgrade from an entry level to a premium model or downgrade from premium to entry level without replacing the semiconductor products, controllers, and/or the entire CAM machine.

Instead, implementations of the systems and methods discussed herein provide a customizable semiconductor product that may include a variety of functional modules or blocks that may be dynamically enabled or disabled after delivery to the customer and/or installation in a machine or appliance. In some implementations, the customizable semiconductor product may be configured once, with functional modules permanently enabled or disabled (e.g. via one-time programmable fuses or similar permanent switches or non-volatile memory). In other implementations, the customizable semiconductor product may be dynamically reconfigured (e.g. at runtime) by loading a configuration and applying the configuration to switches and gates within the customizable semiconductor product to isolate functional blocks, control signal pathways, or otherwise modify the processing capabilities of the customizable semiconductor product. The resulting customizable semiconductor product may provide flexibility and reduce manufacturing costs, while still allowing manufacturer control over capabilities provided to each customer. Due to the inclusion of the specialized hardware functional blocks, the customizable semiconductor product may also have greater capabilities and/or operate faster or with higher efficiency than more generic processors (e.g. generic processors executing software, FPGAs configured for specific operations, etc.).

Below are detailed descriptions of various concepts related to, and embodiments of, techniques, approaches, methods, apparatuses, and systems for customizing a semiconductor product. The various concepts introduced above and discussed in detail below can be implemented in any of numerous ways, as the described concepts are not limited to any particular manner of implementation. Examples of specific embodiments and applications are provided primarily for illustrative purposes.

In an embodiment, a semiconductor product being convertible or converted from a customizable configuration into a selectable or selected one of a plurality of different customized configurations is provided (i.e. the semiconductor product may have the capability to be convertible from a customizable configuration into any of different customized configurations in accordance with a selection, and may either be in an already selected converted customized state or may be capable of being convertible from a present non-customized state into a still selectable customized state). The semiconductor product comprises a customizing unit configured for customizing the semiconductor product into one of the customized configurations selected by a received customizing data structure specifying a selected application of the semiconductor product. Furthermore, the semiconductor product comprises a plurality of functional blocks each configured for providing an assigned functionality and all being deactivated when the semiconductor product is not in one of the customized configurations. The customizing unit is configured for activating only a subgroup of the functional blocks based on the received customizing data structure, e.g. by activating switches or programmable fuses to isolate or enable/disable functional blocks, modifying signal flow pathways or orders of execution of functional blocks, or other similar operations.

In another embodiment, a method of customizing a security-sensitive semiconductor product is provided, wherein the method comprises supplying the customizable security-sensitive semiconductor product from a product supplier entity to a product recipient entity. Thereafter, the method comprises transmitting to the security-sensitive semiconductor product a customizing data structure created by the product supplier entity to customize the supplied security-sensitive semiconductor product in accordance with an application of the supplied semiconductor product specified by the product recipient entity. Moreover, the method comprises customizing a configuration of the supplied security-sensitive semiconductor product based on the customizing data structure and in accordance with the specified application.

In still another embodiment, a method of customizing a security-sensitive semiconductor product is provided, wherein the method comprises supplying the customizable security-sensitive semiconductor product by a product supplier entity. Furthermore, the method comprises transmitting to the security-sensitive semiconductor product a customizing data structure created by the product supplier entity to customize the supplied security-sensitive semiconductor product in accordance with a specified application of the supplied semiconductor product. Moreover, the method comprises customizing a configuration of the supplied security-sensitive semiconductor product based on the customizing data structure and in accordance with the specified application.

In yet another embodiment, an arrangement is provided which comprises a product supplier entity for supplying a customizable security-sensitive semiconductor product, and the customizable security-sensitive semiconductor product comprising security features. The customizable semiconductor product and the product supplier entity are configured for cooperating to customize a configuration of the supplied security-sensitive semiconductor product in accordance with a specified application.

In yet another embodiment, an arrangement is provided which comprises a product supplier entity for supplying a customizable security-sensitive semiconductor product to a product recipient entity, and the customizable security-sensitive semiconductor product. The product supplier entity is configured for receiving a customizing request from the product recipient entity to customize the supplied security-sensitive semiconductor product in accordance with an application of the supplied semiconductor product specified by the product recipient entity. The customizable semiconductor product and the product supplier entity are configured for cooperating to customize a configuration of the supplied security-sensitive semiconductor product in accordance with the specified application.

In the context of the present application, a "semiconductor product" may, for example, comprise a physical body, component or member, or even a device made of two or more different elements, being manufactured partially or entirely in semiconductor technology. For instance, the semiconductor product may comprise one or more semiconductor chips, in particular a naked or molded die. Also systems on a chip (SoC), modules, chiplets or other electronic devices comprising one or a plurality of semiconductor chips may be denoted as semiconductor product. Semiconductor products may be manufactured in various materials, including for example in group IV semiconductor technology (for instance in silicon technology) or in group III-V semiconductor technology (for example in gallium arsenide technology).

In the context of the present application, the term "security-sensitive semiconductor product" may denote, for example, a semiconductor product having at least one security feature. For instance, such a semiconductor product may comprise at least one secure unit (such as a crypto engine) and/or may operate by encrypted communication, for instance may be configured for communicating and/or processing encrypted signals. A security-sensitive semiconductor product may operate using one or more cryptographic keys. Additionally or alternatively, a security-sensitive semiconductor product may be capable of executing authentication tasks and/or other security related tasks requiring cryptographic operations or non-cryptographic modules which can be utilised to protect private data. In particular, a security-sensitive semiconductor product may comprise one or more security assets. In a security-sensitive semiconductor product, at least a part of functional blocks provides security features of the semiconductor product. Configurations of a customizable semiconductor product may be for security features of the semiconductor product, which include security and other processing functions, which may be selectively enabled or disabled. For example, a feature relating to security key-based access to the semiconductor product, a feature relating to management of access restrictions to the semiconductor product and/or other security-related features may be provided in a security-sensitive semiconductor product.

In the context of the present application, the term "customizable" may denote for example that a semiconductor product may be equipped with resources and/or may be configured for cooperation with at least one other entity to allow the customizable semiconductor product to be transferred from a still customizable configuration into a customized configuration. Customizing a customizable semiconductor product may then denote the process of activating certain functional blocks while deactivating other functional blocks of the semiconductor product in accordance with a customizing data structure or scheme. A customizable semiconductor product may still be in a generic configuration, based on which it can be transferred into one of a plurality of different selectable specific configurations, in which the semiconductor product is customized.

In the context of the present application, the term "customized" may denote for example a property of a semiconductor product according to which the semiconductor product has been, prior to customization, freely customizable, but has meanwhile been customized so as to assume a specific rather than generic state. When the semiconductor product is in a customized state, it may be disabled from being convertible back into the generic state or into another specific customized state. In yet another embodiment, a controlling entity (such as a product supplier entity) may be enabled to convert back a customized semiconductor product into a customizable state or into another specific customized state.

In the context of the present application, the term "configuration" may denote for example a specific setting of a semiconductor product. Such a configuration or setting may be in terms of security, so that for instance a semiconductor products may be in a secure configuration in which it has a certain security personality. In the context of the present application, the term "security personality" may denote for example a security configuration of a device for providing a specific service, and/or for supporting a specific use case. A security personality may be defined by hardware and/or software. A security personality may be defined by a customizing data structure and may define which (in particular security-related) functional blocks shall be enabled and which other functional blocks shall be disabled. To give an example for a security personality in terms of conditional access (CA), if CA alternative A is enabled, other CA alternatives B, C, etc., may be disabled. In another example related to a multi CA configuration, if CA alternatives A and B are enabled, other CA alternatives C, D or DRM A, etc., may be disabled. While a semiconductor product (such as a semiconductor chip) may have hardware and/or firmware required for supporting different security-related functions, the security configuration may define a specific set of enabled and disabled functions. Additionally or alternatively, such a configuration or setting may be application-specific so that in accordance with a specific desired or selected application the semiconductor product is provided with a certain functionality. Both in terms of a security configuration and an application-specific configuration, a respective appropriate subset of security and/or application-related functional blocks may be activated in the semiconductor product, whereas non-appropriate and/or non-used and/or non-selected other security-related and/or application-related functional blocks may be deactivated in the semiconductor product.

In the context of the present application, the term "customizing unit" may denote for example a portion (for example realized by hardware such as circuitry and/or by software) of the semiconductor product providing functionality for customizing the semiconductor product, i.e. for converting the semiconductor product from a generic configuration into a specific configuration. For example, such a customizing unit may be configured for receiving a customizing command (such as a customizing data structure, which may be any kind of data set), and may then trigger customization in accordance with the received customizing command.

In the context of the present application, the term "customizing data structure" may denote for example any data structure (such as a data set or data stream or data signal) including information as to how a customizable semiconductor product shall be customized. For example, in some implementations, a customizing data structure may comprise a bitstring, array, or other sequence of commands for enabling or disabling functional blocks of a customizable semiconductor product. In some implementations, the customizing data structure may be encrypted and may be decrypted for use, e.g. by decryption hardware in a functional block of the customizable semiconductor product or in a co-processor or other hardware. This may allow for secure delivery of configuration instructions and execution and dynamic reconfiguration of the customizable semiconductor product at runtime, in some implementations. For example, a customizable semiconductor product may include a decryption block storing a decryption key set by a manufacture of the customizable semiconductor product. A customizing data structure comprising an encrypted configuration string may be loaded into the decryption block, which may decrypt and recover the configuration string, which may then be applied to enable or disable additional functional blocks of the customizable semiconductor product. In some implementations, different decryption keys may be stored in the customizable semiconductor product, allowing for the use of the same customizable semiconductor product with multiple customers or manufacturers without requiring reuse of a key.

In the context of the present application, the term "functional block" may denote for example a portion (for example realized by hardware such as circuitry and/or by software) of the semiconductor product providing resources for providing a dedicated function. For instance, such functional blocks may provide a security function (and can then be denoted for example functional security block) and/or an application-related function (and can then be denoted for example functional application-related block). Functional blocks may be redundant, i.e. a number of different functional blocks may provide a comparable functionality (such as a video, audio, conditional access, digital rights management and/or crypto function), wherein one of said different functional blocks may be selected to provide the specific type of functionality in accordance with a customization of the customizable semiconductor product.

In the context of the present application, the term "deactivated when the semiconductor product is not in one of the customized configurations" may denote for example that all functional blocks may be blocked, disabled or deactivated in a default configuration of a customizable semiconductor product. Only by a specific action (in particular by customizing the customizable semiconductor product), such a deactivated default setting may be overcome, and individual functional blocks may become active.

In the context of the present application, the term "product supplier entity" may denote for example an entity providing the function of supplying customizable semiconductor products. Such a product supplier entity may comprise one or more functionally cooperating product supplier sub entities all contributing to the supply of customizable semiconductor products. One of said product supplier sub entities may control a stock of customizable semiconductor products and may initiate shipping of customizable semiconductor products to a defined destination. Another one of said product supplier sub entities may have computing, processing, communications and/or networking resources and may be configured for providing data such as a customizing data structure for customizing customizable semiconductor products delivered by the aforementioned product supplier sub entity. One or more further product supplier sub entities may be provided as well, for instance a semiconductor manufacturing plant. The various product supplier sub entities may be co-located, or may be arranged mutually remote at different locations. For instance, a product supplier entity may be a silicon manufacturer or a silicon vendor.

In the context of the present application, the term "product recipient entity" may denote for example an entity providing the function of receiving customizable semiconductor products. In particular, such a product recipient entity may also be configured for triggering customization of the semiconductor products for a certain application, and using the customized semiconductor products for further processing (for instance for manufacturing original equipment using said customized semiconductor products). For instance, original equipment in form of a set-top box, a mobile phone, a laptop computer, a router, a modem, a broadband product, and a television (TV) set may be manufactured on the basis of the customized semiconductor products. A product recipient entity may comprise one or more functionally cooperating product recipient sub entities all contributing to the receipt, customization and further processing of customizable semiconductor products. One of said product recipient sub entities may be a sub entity triggering, in particular in collaboration with the product supplier entity, customizing semiconductor products, which are beforehand still customizable. Another product recipient sub entity may be involved in further processing of application-specific customized semiconductor products.

In the context of the present application, the term "specified application" may denote for example a technical task which a customized semiconductor product shall fulfill. For instance, a semiconductor product used for manufacturing set-top boxes may have to fulfill different technical tasks as compared with semiconductor products used for manufacturing routers, cable modems, etc. As mentioned above, the customizable semiconductor products may be generic or multi-purpose semiconductor products having resources capable of supporting different technical tasks. For rendering a customizable semiconductor product particularly appropriate for a specific technical task, said technical task may be defined, i.e. its intended application may be specified. Thereafter, the customizable semiconductor product may be customized specifically in accordance with the intended application.

In the context of the present application, the term "customizing request" may denote for example any communication message or other data signal or flag including the instruction to customize one or more customizable semiconductor products. Such a customizing request may include additional information, such as the number of semiconductor products to be customized accordingly, an application to be fulfilled by the customized semiconductor products, etc.

According to exemplary embodiments, semiconductor products may be provided which may be initially in a generic customizable configuration, but can be later customized to convert them into an application-specific configuration. Thus, at the very beginning, the semiconductor products may still be application-unspecific. This means that a respective semiconductor product may be initially not still configured specifically with respect to the application to be supported by said semiconductor product during later actual use. In contrast to this, the mentioned semiconductor product may be customized later, although it may initially have resources for supporting a plurality of different applications. Only upon receipt of a customizing request, the generic semiconductor products will be converted into a specific configuration to be adjusted to fulfill specifically a defined application. Said customizing request may include an instruction to customize the respective semiconductor product in accordance with the defined application to be fulfilled by said semiconductor product during actual use. In particular, functional blocks as resources for providing other applications may be permanently disabled (or reversibly disabled, in some implementations) in a customized semiconductor product. Advantageously, the semiconductor products may be manufactured by a product supplier entity or supplied by a product supplier entity for example to a product recipient entity in the still customizable form. In particular, customization can then be performed when the semiconductor products are already at the premises of the product recipient entity in accordance with application-specific attributes provided by a customizing data structure. Hence, the logistic in terms of stocking semiconductor products used for different technical applications may be significantly simplified. It may be sufficient to stock only a single type (or a small number of types) of semiconductor products in a still customizable generic condition, and to specifically customize individual ones of the semiconductor products to render them adjusted for supporting a specific application. Advantageously, the number of types of generic semiconductor products may be smaller than a number of applications supported by said semiconductor products when customized. Further advantageously, the still generic customizable semiconductor products may be provided in a default configuration in which all its functional blocks (to be customized in accordance with an intended application) remain blocked, deactivated or disabled until a customizing request is received and executed by a customizing unit of the semiconductor product for customizing the latter. This deactivated default configuration of a customizable generic semiconductor product may prevent misuse.

In an embodiment, the entire process of customizing a customizable semiconductor product may be carried out by a product supplier entity alone. Hence, the presence and role of a separate product recipient entity is optional, although advantageous.

Generally, embodiments may improve the supply chain for semiconductor products, in particular semiconductor products for broadband and video applications. Furthermore, an improved supply chain architecture may be provided, which may be of particular advantage for secure parts.

In an embodiment, the semiconductor product has integrated resources providing the plurality of customized configurations. Such resources may be hardware and/or software resources integrated in the semiconductor product itself.

In an embodiment, the plurality of customized configurations are secure customized configurations. For example, security keys, security passwords, access restrictions and/or other security-related features may be specified in a respective customized configuration of the semiconductor product. This may increase data security. More generally, the customizing unit may be one of the group consisting of a secure customizing unit and a non-secure customizing unit. For example, a secure customizing unit may require provision of a keyword, password, or any other proof of authorization for allowing external entity (in particular the product supplier entity) to access the secure customizing unit. For instance, a secure customizing unit may accept a received customization data structure as the basis for customizing its semiconductor product only when at least one predefined security proof is provided for a corresponding authorization of a creator of the customization data structure. For instance, a non-secure customizing unit may accept a customization data structure as a basis for customizing a semiconductor product without security proof.

In an embodiment, the customizing data structure comprises at least one of the group consisting of at least one customizing file and at least one customizing message. For example, a customizing file may be a computer file related to customization, i.e. a resource for storing information processable by a processor and needed for customizing the semiconductor product. For instance, a customizing message may be a communication message transmitted from the product supplier entity to the semiconductor product by wireless or wired communication over a communication link. Said communication message may be interpretable by the customizing unit of the semiconductor product for deriving information from the customizing message as to how customization of the semiconductor product shall be executed. Thus, the customizing data structure can be for example a message or a plurality of messages which can arrive in form of several kinds of data sets like a file, but are not limited to this.

In an embodiment, the customizing unit is configured for re-customizing the semiconductor product after customizing. In particular, the framework of exemplary embodiments may also allow enabling and/or disabling other features of a customized semiconductor product in the field (for example later in the life cycle of the semiconductor product and if customer desires to add more features). More generally, re-customizing a customized semiconductor product may comprise adding at least one security feature, adding at least one application-specific feature, removing at least one security feature, and/or removing at least one application-specific feature. The customizing unit, in particular under control of the product supplier entity, may also be configured for converting a customized semiconductor product back into a non-customized customizable configuration.

In an embodiment, at least part of the functional blocks is configured for providing an application-specific functionality, wherein the customizing unit is configured for activating only a subgroup of the functional blocks providing the application-specific functionality in accordance with the selected application specified by the received customizing data structure. For instance, functional blocks with application-specific functionality may provide functions such as video applications, audio applications, cryptographic applications, key ladder applications, digital rights management (DRM), conditional access (CA), one-time programmable (OTP) applications, etc. For instance, a respective functionality (for example video processing) may be provided by a subgroup of functional blocks, for instance in terms of video processing in accordance with different industrial standards. For customizing a semiconductor product in accordance with a specific video functionality, one of said functional blocks representing video processing resources may be activated upon customizing. This may be done for different subgroups of alternative or redundant functional blocks.

In an embodiment, at least part of the functional blocks provides a security function, wherein the customizing unit is configured for activating at least one of the functional blocks providing a security function based on the received customizing data structure. For example, security key-based access to the semiconductor product, management of access restrictions to the semiconductor product and/or other security-related features may be provided as security function of a functional block of the semiconductor product. For instance, a plurality of security functions (in particular the provision of security assets) may be provided by various functional blocks. When customizing a previously generic or customizable semiconductor product, one or a subset of security functions of a larger number of security-related functional blocks may be selected. By taking this measure, the security configuration of a semiconductor product may be specified in accordance with requirements of a certain customizing request and/or a corresponding specified application.

In an embodiment, the customizing unit is configured for customizing the semiconductor product only upon receiving and validating the customizing data structure. Correspondingly, the method may comprise including a security personality in the customizing data structure, and customizing the supplied security-sensitive semiconductor product in accordance with the customizing data structure only after validation of the included security personality. Hence, in the described embodiments, the receipt of a customizing request alone will not be sufficient for executing the customizing request. Before doing this, the semiconductor product may check the validity of the customizing data structure, to prevent unauthorized customizing. This may improve the protection against a hacker attack or any other unauthorized customization.

In an embodiment, the customizing unit is configured for customizing the semiconductor product in accordance with a security personality provided by the customizing data structure. Thus, the customizing data structure may not only include information concerning an application to be supported by the customized semiconductor product, but may also provide a security personality to the semiconductor product. Advantageously, the security personality for the semiconductor product to be customized may be provided under control of the product supplier entity, so that the system can be operated in a safe way also without recognizing the product recipient entity as a trusted party.

In an embodiment, the customizing unit is configured for converting a memory (such as a non-volatile memory, or a combination of volatile and non-volatile memory) of the semiconductor product into a permanent state upon customizing. Hence, when the memory is converted into the permanent state, a third party accessing the customized semiconductor product will not be able to manipulate the customized semiconductor product by modifying a state of the memory.

In an embodiment, the semiconductor product comprises a final setting unit configured for finalizing a setting of the semiconductor product after receipt of the customizing data structure and upon receipt of a finalizing request. For instance, a finalizing request may be a communication message being separate from the customizing data structure and being transmitted to the semiconductor product after it has received the customizing data structure. The finalizing request may be transmitted to the final setting unit of the semiconductor product for controlling the semiconductor product to assume a state in which the customizing process is finally completed. For instance, the finalizing request may comprise instructions causing the final setting unit to reject any subsequent attempt of changing the customization of the semiconductor product after receipt of the finalizing request. In such an embodiment, the customization process will not be completed before the setting of the semiconductor product is finalized by a finalizing request. For instance, the finalizing request may be transmitted from the product recipient entity (or from the product supplier entity) to the semiconductor product to be customized. In a preferred embodiment, completing customizing of the semiconductor product may require an action from the product supplier entity (in particular the provision of a customizing data structure to the semiconductor product) and from the product recipient entity (i.e. the above-described finalizing request).

In an embodiment, the final setting unit is capable of deactivating the semiconductor product unless a finalizing request is received which meets at least one validity criterion. For example, the finalizing request may be accepted by the final setting unit for finalizing the customization process only if the finalizing request indicates that it has been sent by an authorized entity. For instance, said authorized entity may be the product recipient entity. Hence, a validity criterion which the finalizing request must fulfill to be accepted may be for example that the finalizing request comprises a secret key or a reference to a previously transmitted customization data structure. For instance, the customization data structure may include an indicator which validity criterion a later transmitted finalizing request must fulfill to be accepted. If the customizing process is not duly completed by the finalizing request, there is the option to disable the semiconductor product for avoiding misuse. For instance, the product supplier entity may be provided with the power to deactivate a semiconductor product for which customization has not been duly completed.

In an embodiment, the final setting unit is configured for converting a further memory (such as a non-volatile memory) of the semiconductor product into a permanent state upon finalizing the setting. Thus, when the further memory is converted into the permanent state, a third party accessing the customized semiconductor product will not be able to manipulate the customized semiconductor product by changing the setting of said further memory.

In an embodiment, the final setting unit and the customizing unit are one common unit. This may allow to reduce the customizing effort on hardware level while nevertheless maintaining full control over the process.

In one embodiment, the semiconductor product is in the customizable configuration. Hence, the semiconductor product may be in a state in which it still supports multiple different applications, which may however be blocked until the selection of a specific application is made.

In another embodiment, the semiconductor product is in one of the customized configurations. In such a customized configuration, the semiconductor product can be in a state in which it supports a specific application in accordance with a number of functional blocks being activated, whereas other functional blocks, which are not needed for said application, may be deactivated. Re-customization of a customized semiconductor product may be rendered impossible, or may be allowed only under certain conditions, for instance only after authentication of a modifying party (such as a product supplier entity). The deactivated functional blocks may however still form part of the hardware of the customized configuration, but may be not accessible or usable for processing a signal or data. For example, input and/or output buses from the deactivated functional blocks may be disconnected, e.g. via programmable fuses, switches, gates, unbiased transistors, etc.

In an embodiment, the method comprises customizing the configuration completely under control of the product supplier entity. In other words, in such embodiments, only the product supplier entity creating a customizing data structure may be able to customize a customizable semiconductor product. Limiting customizability of a semiconductor product to a party in possession of the customizing data structure (which may be a sort of license) may allow delivery of a customizable semiconductor product even to a non-trusted entity (such as a product recipient entity). This simplifies and speeds up the process of customizing (since no certification of the product recipient entity as a trusted party may be necessary) while simultaneously ensuring a high degree of security.

In an embodiment, the product supplier entity is located remote from the semiconductor product and remote from the product recipient entity, at the time of customizing said semiconductor product. In an embodiment, the method comprises customizing the configuration of the security-sensitive semiconductor product at a location of the product recipient entity. By enabling customization of a semiconductor product only under control of the product supplier entity, customizing a semiconductor product may be done from any location without compromising on security. Advantageously, the product supplier entity may be the creator of the customizing data structure required for customizing, so that the process of customization may be executed entirely under control of the product supplier entity. Thus, the system of customizing the semiconductor products may be flexible concerning the location of the involved entities or nodes, i.e. product supplier entity, product recipient entity and semiconductor product.

In an embodiment, the method comprises customizing the configuration by a customizing unit forming part of the semiconductor product. Hence, the actual process of customizing may be performed internally within the semiconductor product by the customizing unit, which may be preferably a secure unit. Said customizing unit of the semiconductor product may define a configuration of a plurality of functional blocks of the semiconductor product in accordance with a specified application to be supported by the customized semiconductor product. A customizing process may be triggered by the receipt of a customizing data structure, originating from the product supplier entity, by the customizing unit, and including the information how the semiconductor product shall be customized.

In an embodiment, the method comprises customizing at least one configuration of the group consisting of a security configuration providing a security personality to the security-sensitive semiconductor product, and an application-specific configuration customized by activating only a sub-group of a plurality of previously deactivated application-specific functional blocks of the security-sensitive semiconductor product. For customizing a security configuration of the semiconductor product, a corresponding customizing data structure may include such a security personality specifically for the semiconductor products to be customized. Furthermore, customizing a semiconductor product in terms of security may also include the selection of a subset of security assets supported or provided by the semiconductor product. Some of said security assets may be activated, the rest may remain permanently inactive. Also on the level of application-specific functionality, a corresponding process of selective activation of individual functional blocks may be carried out.

In an embodiment, the method comprises physically shipping the security-sensitive semiconductor product from the product supplier entity to the product recipient entity prior to said customizing. Hence, the processes of shipping customizable semiconductor products and customizing them in an application-specific way may be completely decoupled from each other without limiting the achievable degree of security. This may simplify the logistics.

In an embodiment, the method comprises customizing the configuration of the supplied security-sensitive semiconductor product via a communications network. For instance, one or more communication messages transmitted during the process of customizing semiconductor products may be transmitted over a communications network such as the public Internet and/or an intranet. Transmission of said communication messages may be encrypted or not.

In an embodiment, the method comprises supplying the semiconductor product in a generic condition being customizable into a specifiable one of a plurality of different specific configurations each assigned to a respective one of different applications of the semiconductor product. In this context, the term "generic condition" may mean for example that the customizable semiconductor product is still suitable for supporting different applications, wherein a semiconductor product in a "specific configuration" may still contain all hardware of the semiconductor product for supporting each and every of the applications of the semiconductor product in the generic condition, however with a presently unused number of functional blocks being deactivated. In other words, the specific configuration may have only a subset of the functional blocks activated, i.e. those which are used for the specified application.

In particular, "generic condition" may mean that the semiconductor product may support all required operation modes for a market segment with multiple CAs (Conditional Access) and DRMs (Digital Rights Management) and other security features. In particular, DRM tools may denote a set of access control technologies for restricting the use of proprietary hardware and restricted content (such as copyrighted works). DRM technologies may try to control the use, modification, and distribution of such content (for instance software, multimedia content, etc.), as well as systems within devices that enforce these policies. A module controlling conditional access may be an electronic device, for instance incorporating a slot for a smart card, which equips a set-top box or the like with an appropriate hardware facility to access (in particular view) conditional access content that has been encrypted.

In an embodiment, the configuration is indicative of an assigned digital rights management (DRM) configuration of the semiconductor product. For example, a DRM configuration may denote one or more parameters or other settings defining restricted use of proprietary hardware and restricted content (for instance audio and/or video content managed by a set-top box, digital television content, software content, multimedia content, etc.). Hence, also a DRM configuration may be customized for a semiconductor product. This makes a corresponding semiconductor product highly appropriate for applications such as set-top boxes, TVs, streaming devices, or any video or broadband device. In an embodiment, the configuration is indicative of a conditional access (CA) configuration of the semiconductor product. For example, a CA configuration may denote one or more parameters or other settings defining the protection of content by requiring certain criteria to be met before granting access to the content (for instance audio and/or video content managed by a set-top box, digital television content, software content, multimedia content, etc.).

In an embodiment, the semiconductor product comprises at least one of the group consisting of a broadband chip and a video chip. For example, a broadband chip may be embodied as a multimedia gateway SoC (system-on-a-chip) which may provide functionality in terms of multistream internet protocol television (IPTV), voice, data and home networking. However, the semiconductor product may also be used for other applications, such as audio applications.

In an embodiment, the method comprises customizing a security configuration of the supplied semiconductor product by assigning to the semiconductor product at least one of the group consisting of at least one encryption key and at least one authentication key. Hence, also key management may be integrated in the customizing architecture.

In an embodiment, the method comprises customizing the configuration of the semiconductor product under control of the product supplier entity during further processing of the semiconductor product by the product recipient entity. Such a further processing of the semiconductor product may include for example the manufacture of electronic devices, such as original equipment, comprising one or more of the customized semiconductor products. For instance, the product supplier entity may customize the semiconductor products from a remote position while the product recipient entity further processes the customized semiconductor products, for instance for manufacturing original equipment such as set-top boxes.

In an embodiment, the method comprises, during or after the customizing, manufacturing original equipment by the product recipient entity based on the customized semiconductor product. For instance, original equipment in form of a set-top box, a router, a modem, a broadband product, and a television (TV) set may be manufactured on the basis of the customized semiconductor products.

In an embodiment, the method comprises supplying the customizable security-sensitive semiconductor product in the form of a chipset. For example, a "chipset" may denote a set of electronic components in an integrated circuit such as a data flow management system that manages a data flow between a processor, a memory and peripherals. A chipset may for instance be assembled at a motherboard. Chipsets may be designed to work microprocessors.

In an embodiment, the method comprises monitoring the customized semiconductor product by the product supplier entity, and, if the monitored customized semiconductor product fails to comply with at least one predefined security criterion, deactivating said semiconductor product. In such an embodiment, the product supplier entity has the possibility to keep on monitoring a customized semiconductor product after customization so that later misuse, for instance in the event of a hacker attack, can be avoided by deactivating the semiconductor product and thereby rendering it unusable.

In an embodiment, the method comprises re-using security features being permanently deactivated in the customized configuration of the semiconductor product for another semiconductor product to be customized. Since only a subset of functional blocks related to security may be activated in dependence of the requirements of a specified application or a customizing data structure, another portion of the functional blocks relating to security may be unused in a customized semiconductor product. It is even possible that only a very small portion (for example not more than 10%) of the security assets provided by the semiconductor product are in fact used after customizing. In order to improve the efficiency of using security resources, it may be possible that the unused or permanently deactivated functional blocks related to security (such as keywords) are used for other purposes, for instance for providing security assets to the semiconductor products prior to their customization.

In an embodiment, the method comprises supplying the customizable security-sensitive semiconductor product from the product supplier entity to the product recipient entity with deactivated security features, and activating at least part of said security features only upon customizing. Thus, the process of customizing a semiconductor product may also trigger activation of security features inside of the semiconductor product.

In an embodiment, the method comprises supplying the customizable security-sensitive semiconductor product from the product supplier entity to the product recipient entity with deactivated functionality features, and activating only part of said functionality features only upon customizing. Correspondingly, functional features related to a specific application selected for the semiconductor product to be customized can also be selected and activated upon customizing.

In an embodiment, the method comprises generating a report indicative of at least one of the group consisting of semiconductor products being customized, semiconductor products being non-customized, and permanently deactivated security assets of semiconductor products being customized. Such a report may indicate for each of these semiconductor products its configuration in accordance with its customization, i.e. security features and application-specific features activated (and/or deactivated) for the specific semiconductor product. Such a report may be accessible for example for the product supplier entity so that the product supplier entity has a full overview over the customizing state of its semiconductor products. When the report indicates security assets of a customized semiconductor product which have been permanently deactivated upon customizing, this information may be used as a basis for a decision which security assets of the meanwhile customized semiconductor product can be re-used for other semiconductor products without the risk of creating clones.

In an embodiment, the method comprises providing the customizable semiconductor product with multi-security feature resources allowing the product supplier entity to customize the semiconductor product with at least two different security features by activating at least part of the multi-security feature resources. For example, a plurality of keywords may be provided which can be combined in a free or flexible way for activating subgroups of said security features.

In an embodiment, the arrangement comprises the product recipient entity configured for transmitting the customizing request to the product supplier entity to customize the security-sensitive semiconductor product, supplied by the product supplier entity to the product recipient entity, in accordance with an application of the supplied semiconductor product specified by the product recipient entity by the customizing request. Hence, the arrangement may be composed at least of the product supplier entity (having one or a plurality of sub entities), the product recipient entity (having one or a plurality of sub entities), and the semiconductor products to be customized. Customization of the semiconductor products may be carried out in accordance with application-specific requirements defined by the product recipient entity but under control of the product supplier entity. The latter may provide all software (for example the entire software framework) and the customizing data structure (which may include a security personality of the semiconductor product to be customized) for customizing the semiconductor products.

In an embodiment, the product recipient entity and the product supplier entity are communicatively coupled via a communications network. Thus, the entire process of customizing the semiconductor products under control of the product supplier entity and under consideration of application-specific information provided by the product recipient entity may be carried out by communication messages transmitted over the communications network. For instance, the communications network may be the public Internet, an intranet, a mobile phone communications network, or a combination of several communication networks. Communication may be wireless and/or wire-bound.

In an embodiment, the arrangement comprises a security service provider entity configured for cooperating with the product supplier entity for certifying a security configuration of the semiconductor product when customized. Descriptively speaking, a security service provider entity may provide the service to the product supplier entity to provide liability for security issues which may occur after certification of a security measure in the semiconductor products due to customization.

In an embodiment, the arrangement is configured in blockchain architecture. Hence, product supplier entity, product recipient entity, semiconductor products and, if present, security service provider entities may form part of a distributed system. A blockchain may be a list of blocks, that may be linked together using cryptography. Each block may contain information about the block previous to it, so that they form a chain, with each additional block reinforcing the ones before it. Therefore, blockchains may be resistant to modification of their data because once recorded, the data in any given block cannot be altered retroactively without altering all subsequent blocks.

According to an exemplary embodiment, a supply chain for supplying semiconductor products may be accelerated.

In some approaches not utilizing implementations of the systems and methods discussed herein, a product supplier entity has to finish CA (Conditional Access) certifications before shipping parts to product recipient entities (such as original equipment manufacturers, OEMs) or has to build custom parts because formation of a security configuration has to happen at the side of the product supplier entity. This may result in long lead times and require complicated SKU (Stock Keeping Unit) management efforts. For example, the product recipient entity may not want to stock parts until operators place orders. For instance, a product recipient entity may delay placing SoC (system-on-a-chip) orders until after the operators place orders for STB (set-top box) or other technical devices that use those SoC's.

In some implementations not utilizing the systems and methods discussed herein, security products are completely serialized (for instance, provided with security configuration, encryption keys, authentication keys) at a product supplier entity's manufacturing line (i.e. before being shipped out). This means that once a product recipient entity receives a product from the product supplier entity, it can only be utilized for a specific application and the product recipient entity has to stock different semiconductor products for each such application. For example, if there are 50 active products and 20 different security configurations, then this would require 50 times 20 different products that product recipient entities have to order and that can only work in a limited number of products. All these products have to be custom built, which typically requires long lead-times and complicates the supply chain.

Examples of why semiconductor products may be fully personalized at a manufacturing line of a product supplier entity are:

Content providers, Conditional Access Providers and Rights Management Entities (aka third party security entities) sometimes do not trust product recipient entities to perform critical configurations related to security Third party security entities may provide secure assets to product supplier entities through black box infrastructures. When black boxes are created at facilities of product recipient entities, this may involve a high effort. Furthermore, such an approach may lead to trust-related issues. Moreover, the mentioned approach may be not feasible because of the amount of different locations being involved.

Product recipient entities are in many cases not trusted to activate, log and handle security assets.

Product recipient entities do not always have the same quality control processes as product supplier entities.

Product recipient entities in many cases do not accept the same type of liabilities that a product supplier entity does.

Product recipient entities may not have the required security knowledge to configure security related items.

Sometimes product recipient entities do not have the resources to certify all security configurations as required by a security provider.

In some instances, a product recipient entity may need to order custom built parts that can only work in a limited number of products. If a product recipient entity has unused stock, then it typically must scrap or try to offload that stock.

In order to overcome at least part of the above-mentioned and/or other shortcomings, exemplary embodiments provide a supply chain improvement which may make it possible to streamline processes. In particular, exemplary embodiments may allow product recipient entities to stock parts and respond quicker to product manufacturing orders (for instance orders of set-top boxes).

Advantageously, exemplary embodiments may move a significant part or even a majority of security serialization of a semiconductor product to a production line of a product recipient entity via a process that may be controlled by the product supplier entity. This means that the product recipient entity can order a generic semiconductor product from a product supplier entity. During the manufacturing of technical devices using such generic semiconductor products, the product recipient entity can permanently activate the required personality for their end product. This means that, in an embodiment, a product recipient entity can stock a reduced number of types of generic semiconductor products or parts and may set a respective configuration (aka personality) during the production of a final technical device.

The described approach of exemplary embodiments may have advantages, since it may provide more security to semiconductor products when shipped out of the product supplier entity, it may be possible for the product supplier entity to monitor and/or enforce a final configuration at the product recipient entity, it may be possible to reliably generate reports at the product recipient entity which may be indicative of which semiconductor products have been enabled or disabled, it may be possible to re-use disabled keys or identifiers, thereby reducing the impact to security provided to generate identifiers, security assets, etc., it may be possible to create a new security configuration after chipset production, it may also be possible to create multi-security configurations, a number of SKUs to manage may be reduced, which may simplify the overall supply chain system, it may be possible to reduce, suppress or even eliminate availability of black market offloading.

Advantageously, an arrangement according to an exemplary embodiment may realize a supply chain infrastructure that may be located in several places, such as:

in a cloud, at a production line of a semiconductor recipient entity, in a non-secure part of a semiconductor product, such as a chipset, in a secure part of a semiconductor product, such as a chipset.

Advantageously, exemplary embodiments may ensure that:

the overall security of the system or arrangement may be kept as required by content providers, conditional access providers, rights management entities, etc., a semiconductor product (such as a chipset) may also be pre-certified with all required parties (for example content providers, external laboratories, conditional access providers), a product recipient entity may reduce costs because the product recipient entity may be able to stock generic semiconductor products and use them across a multitude of applications or projects, third party security entities may have a flexible system allowing them to define project or application based configurations and better address needs of certain applications, and the product recipient entities may not have to make modifications in their existing production line.

Exemplary embodiments may allow for any product configuration and/or personalization to be concluded at the final stage of the final product or technical device. This may increase efficiency at the side of the product supplier entity because there may be a lower number of SKUs to manage. Furthermore, such a system may allow the product recipient entity to stock a smaller variety of semiconductor products. It may be more attractive for a product recipient entity to stock a larger number of generic semiconductor products that can be easily rendered application-specific and used for multiple different technical applications.

FIG. 1 illustrates a flowchart 200 of a method of customizing a security-sensitive semiconductor product 100 according to an exemplary embodiment. Concerning the reference signs used for the description of FIG. 1, reference is made in particular to FIG. 2, FIG. 5 and FIG. 6.

Referring to a block 202, the method may comprise supplying the customizable security-sensitive semiconductor product 100 from a product supplier entity 116, such as a silicon vendor, to a product recipient entity 118, for instance a producer of original equipment 120 (such as set-top boxes) using one or more such semiconductor products 100.

Now referring to a block 204, after said supplying, a customizing data structure 104 created by the product supplier entity 116 may be transmitted to the security-sensitive semiconductor product 100 to customize the supplied security-sensitive semiconductor product 100 in accordance with an application of the supplied semiconductor product 100 specified by the product recipient entity 118.

Referring to a block 206, the method may comprise customizing a configuration of the supplied security-sensitive semiconductor product 100 based on the customizing data structure 104 and in accordance with the specified application.

For example, in one implementation of block 206, a customizing data structure 104 may comprise a bitstring or set of commands from which a bitstring may be constructed for application to a series of functional blocks of a customizable semiconductor product 100. For example, in one such implementation, a customizable semiconductor product 100 may comprise a plurality of functional blocks {A, B, C, D, E, F, . . . } each having different functions such as decrypting an input data stream, decoding a video stream within the decrypted stream, rescaling the decoded stream, transcoding the decoded stream into an alternate format, encrypting the transcoded stream, packetizing the stream, etc. In implementations in which the stream is not encrypted, blocks corresponding to encryption and decryption (e.g. A, E) may be disabled in accordance with a bitstring such as {0, 1, 1, 1, 0, 1 . . . }. Each bit may be extracted and applied to an enable/disable input of a functional block, with the disable bit allowing a signal to pass around the functional block (e.g. by biasing a transistor, activating a switch or gate, opening a fuse, etc.). Other data structures may be used in other implementations, including more complex structures. For example, in some implementations, the customizing data structure 104 may specify an order of connection of functional blocks (e.g. {C, A, B, F, etc.}) and corresponding pathways may be activated.

FIG. 2 illustrates an arrangement 130 for customizing security-sensitive semiconductor products 100 according to an exemplary embodiment.

For instance, each semiconductor product 100 may be a semiconductor chip or chipset. During actual operation of the semiconductor products 100, the semiconductor products 100 may carry out secure communication. Initially, i.e. during supply as indicated by reference sign 171, each of the semiconductor products 100 may be in a customizable generic state, and may be converted into a customized specific state during a customization process indicated by reference sign 173, as described below.

The arrangement 130 comprises a product supplier entity 116 for manufacturing and supplying the customizable security-sensitive semiconductor products 100 to a product recipient entity 118 for further processing. Also product recipient entity 118 belongs to the arrangement 130 according to the described embodiment. Furthermore, the customizable security-sensitive semiconductor products 100 form part of the arrangement 130. Communication is enabled between product supplier entity 116, product recipient entity 118, and semiconductor products 100. As shown, the product recipient entity 118 and the product supplier entity 116 may be communicatively coupled via a communications network (such as the public Internet) for exchanging communication messages (see reference signs 132, 166).

Product supplier entity 116 may be a silicon vendor, producing and shipping generic customizable semiconductor products 100 to product recipient entity 118. Product recipient entity 118 may be an original equipment manufacturer, for instance producing original equipment 120 (such as set-top boxes of different types) based on the semiconductor products 100 after customization. The customizable generic semiconductor products 100 may be physically shipped from the product supplier entity 116 to the product recipient entity 118 prior to customizing. Thus, the semiconductor products 100 may be shipped in a generic condition so as to be customizable into a specifiable one of a plurality of different specific configurations each assigned to a respective one of different applications of each respective semiconductor product 100.

For carrying out customization of the semiconductor products 100, a transmitter unit 152 of the product recipient entity 118 may be configured for transmitting a customizing request 132, in particular in form of a communication message, to a receiver unit 154 of the product supplier entity 116. The customization request 132 may express the intention of the product recipient entity 118 to customize a certain security-sensitive semiconductor product 100, supplied by the product supplier entity 116 to the product recipient entity 118, in accordance with an application of said supplied semiconductor product 100 specified by the product recipient entity 118 by the customizing request 132. For instance, the product recipient unit 118 may desire to configure a first part 140 of supplied and still generic semiconductor products 100 in order to render them specifically appropriate for manufacturing a first type 142 of original equipment 120. Moreover, the product recipient unit 118 may desire to configure a second part 144 of the still generic semiconductor products 100 in order to render them specifically appropriate for manufacturing a second type 146 of original equipment 120. Furthermore, the product recipient unit 118 may desire to configure a third part 148 of the still generic semiconductor products 100 in order to render them specifically appropriate for manufacturing a third type 150 of original equipment 120. One or more corresponding customizing requests 132 may be created by a processing unit 158 of product recipient entity 118. Customizing request 132 may be transmitted from product recipient entity 118 to product supplier entity 116 and may include corresponding information which parts 140, 144, 148 of the customizable semiconductor products 100 shall be used for the respective types 142, 146, 150 of original equipment 120. For determining the described content of the customizing request 132, the processing unit 158 may access data stored in a recipient memory 156 of the product recipient entity 116.

The receiver unit 154 of the product supplier entity 116 is configured for receiving the customizing request 132 from the product recipient entity 118, which can then be processed by a processing unit 160 of the product supplier entity 116. For customizing the supplied security-sensitive semiconductor products 100 in accordance with the applications of the supplied semiconductor products 100 specified by the product recipient entity 118 (i.e. manufacturing the respective types 142, 146, 150 of original equipment 120 based on the differently customized parts 140, 144, 148 of semiconductor products 100), processing unit 160 may create an appropriate customizing data structure 104, such as a customizing file. For creating the customizing data structure 104, the processing unit 160 may access data stored in a supplier memory 162 of the product supplier entity 116. The customizing data structure 104 may include all information which a customizing unit 102 of a respective customizable semiconductor product 100 requires in order to adapt all settings and configurations of the semiconductor product 100 in accordance with the respective application selected for said semiconductor product 100. For instance, one or more first customizing data structures 104 for customizing the first part 140 of customizable semiconductor products 100 so as to become specifically adapted for manufacturing first type 142 of original equipment 120 may differ from one or more other second customizing data structures 104 for customizing the second part 144 of customizable semiconductor products 100 so as to become specifically adapted for manufacturing second type 146 of original equipment 120. One or more third customizing data structures 104 for customizing the third part 148 of customizable semiconductor products 100 for the third type 150 of original equipment 120 may differ as well from the two aforementioned first and second customizing data structures 104. Thus, the customizing data structures 104 may be configured so that a respective generic customizable semiconductor product 100 may be customized in accordance with the respective application-specific requirements (i.e. in accordance with a suitability for manufacturing a respective type 142, 146, 150 of original equipment 120) upon receipt of a correspondingly adapted customizing data structure 104.

More specifically, the customizable semiconductor products 100 and the product supplier entity 116 may be configured for cooperating to customize a configuration of the supplied security-sensitive semiconductor products 100 in accordance with the specified applications: After creation of the respective customizing data structure 104 by the product supplier entity 116, a transmitter unit 164 of the product supplier entity 116 may send a customizing data structure transmission message 166 to a receiver unit 168 of the product recipient entity 118. Customizing data structure 104 may be encrypted. When in possession of a respective customizing data structure 104, the product recipient entity 118 can send the customizing data structure 104 to a corresponding semiconductor product 100 for triggering its customization in accordance with the application-specific data included in the respective customizing data structure 104. Hence, the process of customizing may be executed by a collaboration between the product supplier entity 116 (controlling the entire process of customizing and creating for this purpose customizing data structure 104), the product recipient entity 118 (providing information to product supplier entity 116 for which application a specific semiconductor product 100 shall be used, and forwarding a received customizing data structure 104 to a respective semiconductor product 100), and a semiconductor product 100 to be customized (which may be configured for customizing itself upon receipt and in accordance with a respective customizing data structure 104).

Next, construction of semiconductor product 100 for supporting the above-described architecture will be explained. Reference is hereby made to a detail 170 shown in FIG. 2. The illustrated semiconductor product 100 is convertible (or may already be converted) from a customizable configuration into a selectable (or an already selected) one of a plurality of different customized configurations, such as the configurations indicated with reference sign 140, 144 and 148 in FIG. 2.

For example, semiconductor product 100 is monolithically integrated in a semiconductor substrate 172 (such as a silicon chip) and comprises the above-mentioned customizing unit 102. The latter may be configured for customizing the semiconductor product 100 into one of the customized configurations selected by a received customizing data structure 104 specifying a selected application of the semiconductor product 100. Moreover, the customizable semiconductor product 100 comprises a plurality of functional blocks 106 each configured for providing an assigned functionality and all being deactivated when the semiconductor product 100 is not in one of the customized configurations, but being still customizable. This provides a security protection by disabling the use of the semiconductor product 100 prior to its customization due to the blocking of all functions of the functional blocks 106 before the semiconductor product 100 has been customized. An unauthorized external entity, such as a hacker, can therefore not use the semiconductor product 100 before its security configuration is customized, since all functionality of the semiconductor product 100 is deactivated until the customization is done. For example, in one such implementation, a customizing data structure 104 may be signed and may be first be provided to a decryption functional block which may be used to verify the customizing data structure 104 (e.g., by verifying the signature of the data structure utilizing a pre-encoded key). In such an implementation, only once verified may the customizing data structure 104 be applied to activate functional blocks of the customizable semiconductor product 100. Accordingly, without a properly signed customizing data structure 104, the product may not be activated or utilized (i.e., all functional blocks of the customizable semiconductor product other than the signature verification block may be disabled).

Furthermore, the customizing unit 102 of the semiconductor product 100 is advantageously configured for activating only a subgroup of the functional blocks 106 based on the received customizing data structure 104. More specifically, an application function part 174 of the functional blocks 106 may be configured for providing an application-specific functionality, such as a video-related function, an audio-related function, a digital rights management (DMR)-related function, etc. The customizing unit 102 may be configured for activating only a subgroup of the application function part 174 of the functional blocks 106 providing the application-specific functionality in accordance with the selected application specified by the received customizing data structure 104. For instance, a certain one of different video-related functions supported by semiconductor product 100 may be selected for the first part 140 of semiconductor products 100. Said selected video-related function may be intended for use in the first type 142 of original equipment 120. Other video-related functions supported by semiconductor product 100 as well but relating to a functionality which is not needed for the first type 142 of original equipment 120 may remain deactivated or may be rendered permanently deactivated under control of customizing unit 102. In a corresponding way, an appropriate selection of an appropriate audio-related function among a plurality of different audio-related functions supported by semiconductor product 100 may be made for the first part 140 of semiconductor products 100, an appropriate selection of an appropriate DRM-related function among a plurality of different DRM-related functions supported by semiconductor product 100 may be made for the first part 140 of semiconductor products 100, etc. In FIG. 2, selected functional blocks 106 are indicated with reference sign 178, whereas non-selected or deactivated functional blocks 106 are indicated with reference sign 180.

Furthermore, another part of the functional blocks 106 provides a security function and may thus be denoted as a security-related part 176. Corresponding functional blocks 106 may relate to security-related functions such as an encryption and/or decryption scheme, one or more keywords, etc. As with the application-specific functions, the customizing unit 102 may also be configured for activating one or more—in particular only a sub-group—of the security-related part 176 of functional blocks 106 providing a security function based on the received customizing data structure 104. For each type 142, 146, 150 of original equipment 120, a corresponding appropriate security configuration may be selected for a semiconductor product 100 customized by the assigned customizing data structure 104. In particular, the customizing unit 102 may be configured for customizing the semiconductor product 100 in accordance with a security personality provided by the customizing data structure 104. For customizing, a security personality may be included in the customizing data structure 104. Customizing the supplied security-sensitive semiconductor product 100 may be performed in accordance with the customizing data structure 104 and only after validation of the included security personality. For example, customizing the security configuration of the supplied semiconductor product 100 may be made by assigning to the semiconductor product 100 encryption and/or authentication keys. As can be taken from the multiple blocks 106 of the security-related part 176, it is possible to provide the customizable semiconductor product 100 with multi-security feature resources allowing the product supplier entity 116 to customize the semiconductor product 100 with two or more different security features by activating a corresponding part of the multi-security feature resources.

Hence, customizing may include setting a security configuration (for providing a security personality to the security-sensitive semiconductor products 100) and setting an application-specific configuration (customized by activating only a subgroup of the previously deactivated application-specific functional blocks 106 of the security-sensitive semiconductor products 100). Hence, the customizable security-sensitive semiconductor products 100 may be supplied from the product supplier entity 116 to the product recipient entity 118 with deactivated security features, and only part of said security features is activated upon customizing (see activated subgroup of blocks 178 of security-related part 176). Correspondingly, the customizable security-sensitive semiconductor products 100 may be supplied from the product supplier entity 116 to the product recipient entity 118 with deactivated application-related functionality features, and only part thereof may be activated upon customizing (see activated subgroup of blocks 178 of application function part 174). Thus, the customizable semiconductor product 100 may be in a deactivated default mode and requires a specific action for triggering activation in an application-specific way (e.g., providing a properly signed customizing data structure in some implementations, as discussed above). As a result, a customized semiconductor product 100 may be customized in terms of application-specific functions as well as in terms of security. The customizing process of the semiconductor product 100 may be triggered upon receipt of the customizing data structure 104. Preferably, customizing may be started only after having previously validated the customizing data structure 104 by customizing unit 102, to exclude an unauthorized access to the semiconductor product 100 by a non-authorized party.

For customizing the illustrated security-sensitive customizable semiconductor products 100 supplied from the product supplier entity 116 to the product recipient entity 118, a respective customizing data structure 104 created by the product supplier entity 116 may be supplied from the product recipient entity 118 to the assigned customizable semiconductor product 100 to customize the supplied security-sensitive semiconductor product 100 in accordance with an application of the supplied semiconductor product 100 specified by the product recipient entity 118. This intended application is taken into account by the product supplier entity 116 when forming a corresponding customizing data structure 104. When the customizing unit 102 of the semiconductor product 100 receives the customizing data structure 104, it customizes a configuration of the semiconductor product 100 based on the customizing data structure 104 and therefore in accordance with the specified application. Since the customizing data structure 104 is created under the sole responsibility of the product supplier entity 116 in such implementations, and is executed by the customizing unit 102 of the semiconductor product 100 which goes back to the product supplier entity 116, customizing the configuration occurs completely under control of the product supplier entity 116. Product recipient entity 118 only provides information to product supplier entity 116 concerning the intended use or application of a respective semiconductor product 100, which may be considered for the creation of the customizing data structure 104.

Advantageously, the product supplier entity 116 may be located remote from the semiconductor product 100 and remote from the product recipient entity 118 at the time of customizing. Thus, the process of customizing may be carried out in a flexible and nevertheless secure way from a remote position by transmitting a customizing data structure transmission message 166 including or encoding the customizing data structure 104. The process of customizing a specific configuration of the semiconductor product 100 may be executed by customizing unit 102 forming part of the semiconductor product 100. Thus, customizing the configuration of the security-sensitive semiconductor product 100 may be executed at a location of the product recipient entity 118 and via a communications network for transmitting customizing data structure 104 from product supplier entity 116 to product recipient entity 118. In particular, customizing the configuration of the semiconductor product 100 may be performed under control of the product supplier entity 116 during further processing of the semiconductor product 100 by the product recipient entity 118. After the customizing, original equipment 120 may be manufactured by the product recipient entity 118 based on the customized semiconductor product 100.

Product supplier entity 116 together with semiconductor product 100 may be configured to enable monitoring the customized semiconductor product 100 by the product supplier entity 116 after and/or before customizing. If the monitored customized semiconductor product 100 fails to comply with one or more security criteria which may be assessed during monitoring, the semiconductor product 100 may be deactivated by the product supplier entity 116 from a remote position, for instance via a deactivation message transmitted by a communications network. This may prevent misuse and, if a suspicious behavior is found, may allow to render a semiconductor product 100 unusable to significantly reduce usability of such a semiconductor product 100 for a hacker or another unauthorized entity.

As already explained above, only a part of the security assets of a respective semiconductor product 100 may be used after its customization or activation, i.e. only the activated subgroup of blocks 178 of the security-related part 176 of the functional blocks 106. A significant number of security-related functional blocks 106 will be permanently deactivated in a customized semiconductor product 100 (i.e. non-selected blocks 180 of the security-related part 176 of the functional blocks 106). In order to increase the efficiency of usage of security resources, it may be possible to re-use security features being permanently deactivated in the customized configuration of the semiconductor product 100 for another semiconductor product 100 to be customized. This can be done under control of the product supplier entity 116 which may assign permanently disabled security resources of a customized semiconductor product 100 for equipping another customizable semiconductor product 100 with security resources, such as keys.

FIG. 3 illustrates a generic supply line according to an exemplary embodiment. In such embodiments, "generic" may refer to the customizable semiconductor products being manufactured and provided in a non-application-specific state or without customization, rather than that the supply line itself is generic.

Referring to FIG. 3, the generic customizable semiconductor products 100 may be ordered (see reference sign 182) by a product recipient entity 118 from a product supplier entity 116 (the latter is not shown in FIG. 3). Thereafter, the generic customizable semiconductor products 100 are shipped from product supplier entity 116 to product recipient entity 118 (see reference sign 184). At premises of product recipient entity 118, the generic customizable semiconductor product 100 can be customized so as to render it specifically appropriate to be used for the manufacture of original equipment 120, such as a specific set-top box.

In order to activate a chipset personality of a customizable semiconductor product 100 at an OEM (original equipment manufacturer)-type product recipient entity 118, security requirements of the semiconductor product 100 may be taken into account. Furthermore, it may be possible to monitor a semiconductor product 100, and to deactivate or even destroy the semiconductor product 100 in case the configuration is not as expected and/or required. For example, in one implementation, the customizing data structure applied to activate or deactivate functional blocks may include a segment of test data which may be processed by the semiconductor product 100 after configuration and compared to an expected result; if the processed result does not match the expected result, the semiconductor product 100 may be deactivated (temporarily or permanently, e.g., by activating fusible links or one-time programmable fuses to short an input bus or open an output bus, etc.). By exemplary embodiments, the impact of the supply chain for the product recipient entity 118 can be kept very small. For instance, it may be possible to refrain from extra reboots or additional manufacturing images. Since the product supplier entity 116 or one or more key providers may have to provide more keys for a semiconductor product 100 than necessary in a customized configuration of the semiconductor product 100 (see non-selected blocks 180 of the security-related part 176 of the blocks 106 in FIG. 2), it may even happen that a majority of the provided keys will be disabled for the semiconductor product 100. Therefore, in some implementations, permanently disabled keys may be re-used without having cloned parts. Preventing cloning may ensure that keys are not used more than once in the field.

Advantageously, exemplary embodiments provide a high level of security to parts when shipped out of the product supplier entity 116. Contrary to approaches not utilizing implementations of the systems and methods discussed herein, semiconductor products 100 may leave a product supplier entity 116 with the security disabled, wherein the security can only be enabled at the product recipient entity 118 once the semiconductor product 100 is fully configured. Advantageously, in such implementations, the configuration can only occur using tools provided by the product supplier entity 116 (e.g. tools configured to allow for proper generation of a customizing data structure including a signature corresponding to the product supplier entity 116), and therefore there is no risk that non-secure entities can enable and use the secure assets of the chipset or other kind of semiconductor products 100.

Further advantageously, it may be possible to monitor and/or enforce a final configuration of a semiconductor product 100 used by a product recipient entity 118. In particular, a product supplier entity 116 may be enabled to define and enforce the final configuration of the semiconductor product 100 and not rely on the product recipient entity 116 to correctly configure the semiconductor product 100. This is very valuable because, if an OEM does not correctly program a semiconductor product (for instance, by inadvertently activating some security features), in approaches not utilizing implementations of the systems and methods discussed herein it may not be possible to do anything and only after the semiconductor product arrives and is hacked may it become apparent that it was not correctly configured. In contrast to this, exemplary embodiments allow a security element to monitor the configuration of a semiconductor product 100, and if not correct disable key features of the semiconductor product 100, for example a chipset. Such a disabling may make the semiconductor product 100 significantly less useful for a hacker or another unauthorized entity.

Furthermore, exemplary embodiments may reliably generate reports at the product recipient entity 118 of which security features (for example IDs) have been enabled or disabled. Such reports may be accessible for the product supplier entity 116. Such a configuration may make it possible to run the arrangement 130 securely even with a product recipient entity 118 which is not trusted. Hence, a corresponding system may automatically create reports per semiconductor product 100 (for instance per chipset) which cannot be tampered by a product recipient entity 118 (such as an original equipment manufacturer, OEM, or original design manufacturer, ODM). Hence, a product supplier entity 116 (such as a silicon vendor) and partners can have a reliable report of what is happening in the production line. Moreover, it may be possible to gather the reports per semiconductor product 100, so that it cannot be tampered. Moreover, the necessity can be implemented in the arrangement 130 that all licenses to activate the security configuration of a customizable semiconductor product 100 must be pre-approved. Furthermore, the arrangement 130 or system may allow to identify when the product recipient entity 118 is underreporting.

According to an exemplary embodiment, it may be possible to re-use disabled identifiers (IDs) for reducing the impact to security partners to generate IDs and security assets. Thus, exemplary embodiments may allow to log which security assets have been permanently disabled at a product recipient entity 118. Said permanently disabled security assets may be re-used when producing new chipsets. Examples of these assets can be individual secret keys that are stored inside the semiconductor product 100. It may be advantageous, in particular when security partners are involved, that it is not possible to clone parts and that every active semiconductor product 100 only has unique security assets.

In an embodiment, it may be possible to create a new security configuration of a semiconductor product 100 after its production. Such an advantageous embodiment may allow defining new security configurations for semiconductor products 100 that have already been produced. Hence, such an advantageous approach is in particular applicable to generic parts or semiconductor products 100 that are in stock.

According to an embodiments, it may also be possible to create multi-security configurations in a semiconductor product 100 to be customized. This may ease the creation of multi-security parts. This may in particular make it possible to provide semiconductor products 100 with more than one set of security assets from one security partner. Hence, exemplary embodiments may allow multi-security assets already pre-programmed in a semiconductor product 100. Upon customizing such a semiconductor product 100, it may be possible to activate a mix of assets in or at a product recipient entity 118, for instance as desired or required for an intended application.

Moreover, exemplary embodiments have the advantage that only a reduced number of SKUs needs to be managed. With a reduced amount of SKUs to manage, the management effort of a product supplier entity 116 and/or a product recipient entity 118 may be reduced.

Furthermore, the concept of providing generic customizable semiconductor products 100 which may be individualized in accordance with a desired specific application by customizing allows a product recipient entity 118 to stock more customizable semiconductor products 100 (such as chipsets), because they can be used across multiple products and applications by a simple customization process.

Furthermore, exemplary embodiments may reduce availability of black market offloading, when customizable semiconductor products 100 leaving the product supplier entity 116 have all security features deactivated. This concept may also allow product supplier entities 116 to ship customizable semiconductor products 100 even to product recipient entities 118 which are not trusted or specifically authorized depending on specific security assets. If there is an excess of stock, in some instances not utilizing implementations of the systems and methods discussed herein, an OEM/ODM can in principle sell the excess stock in the black market where the security partner has no control. In contrast to this, exemplary embodiments may block these activities from happening in a streamlined way. In exemplary embodiments, relevant security assets of a customizable semiconductor product 100 may be deactivated by default and can only be activated in the production line of a product recipient entity 118, in particular under control of product supplier entity 116. If a product recipient entity 116 (such as an OEM or ODM) wants to sell the part in the black market, then it would have to either pre-configure the semiconductor products 100 (i.e. then de-solder the semiconductor products 100) or try to clone the entire activation system or arrangement 130. The latter is very difficult to achieve and in any case highly cumbersome, because of security features of arrangement 130 to block such situations.

Figure 4:
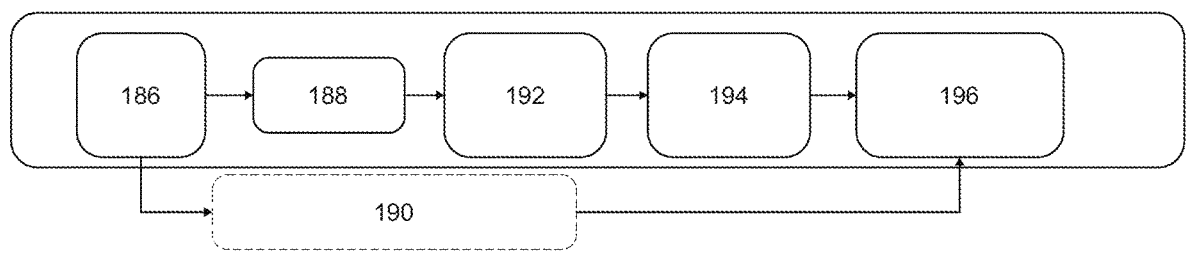
FIG. 4 illustrates a process of customizing a customizable semiconductor product according to an exemplary embodiment.

FIG. 4 illustrates a flowchart of a process of customizing a customizable semiconductor product 100 according to an exemplary embodiment.

As indicated by block 186, the process may start with the creation of a generic semiconductor product 100 by product supplier entity 116. As discussed above, "generic" may refer to the semiconductor product not being customized and including a plurality of functional blocks that may subsequently be enabled or disabled, rather than that the semiconductor product is generic. In block 188, a product recipient entity 118 may order the generic semiconductor products 100, for example from product supplier entity 116. In a block 192, the product supplier entity 116 may ship the generic customizable semiconductor products 100 to the product recipient entity 118. Now referring to a block 194, the product recipient entity 118 may order a required security personality for a respective semiconductor product 100 or group of semiconductor products 100 from product supplier entity 116. In a block 196, the product recipient entity 118 may program the received security personality in its production line. As indicated by a block 190, the product supplier entity 116 may, already after the action according to block 186, certify the security personality with one or more security service provider entities (see reference sign 134 in FIG. 5), such as third-party security vendors (e.g. by verifying cryptographic signatures, providing predetermined test data results to a third-party security vendor, etc.). Hence, collaboration and negotiation with security service provider entities may be already started early, which accelerates the entire process. For example, such security service provider entities may provide liability in case of security issues with customized semiconductor products 100.

Descriptively speaking, a security personality of a semiconductor product 100 may relate to a security configuration of a final product (such as original equipment 120 in which at least one customized semiconductor product 100 is implemented). A specific security configuration may correspond to the activation of certain elements or modules of IP (intellectual property) of the semiconductor product 100, whereas other elements or modules of IP may be deactivated in the semiconductor product 100.

In a system or arrangement 130 according to any of FIG. 2 to FIG. 6, the product supplier entity 116 may provide the entire control framework (in particular in terms of control software) as well as a customizing data structure 104 in which a security personality for a semiconductor product 100 may be included. Thus, the entire control infrastructure of arrangement 130 may be provided by product supplier entity 116 which may therefore control the entire process of configuring a generic semiconductor product 100 (for instance a system-on-a-chip) in accordance with a specification of a provided customizing data structure 104 to make the semiconductor product 100 specific for an application intended or defined by the product recipient entity 118. Advantageously, the customizing data structure 104 may be non-modifiable, encrypted, authenticated and licensed. The infrastructure for customizing a customizable semiconductor product 100 using the customizing data structure 104 may be provided by product supplier entity 116, although the customization may be carried out in the production line of the product recipient entity 118. As part of the above infrastructure, the product supplier entity 116 may install a software in the production line of the product recipient entity 118. Such a software may be configured for working with customizing data structure 104 in order to customize semiconductor product 100.

In a nutshell, an exemplary embodiment may be based on the combination of a generic customizable semiconductor product 100 provided by product supplier entity 116, a customizing data structure 104 provided by product supplier entity 116 and including a security personality for customizing the customizable semiconductor product 100, and a software framework at product recipient entity 118 configured for customizing semiconductor product 100 in accordance with the provided customizing data structure.

Figure 5:
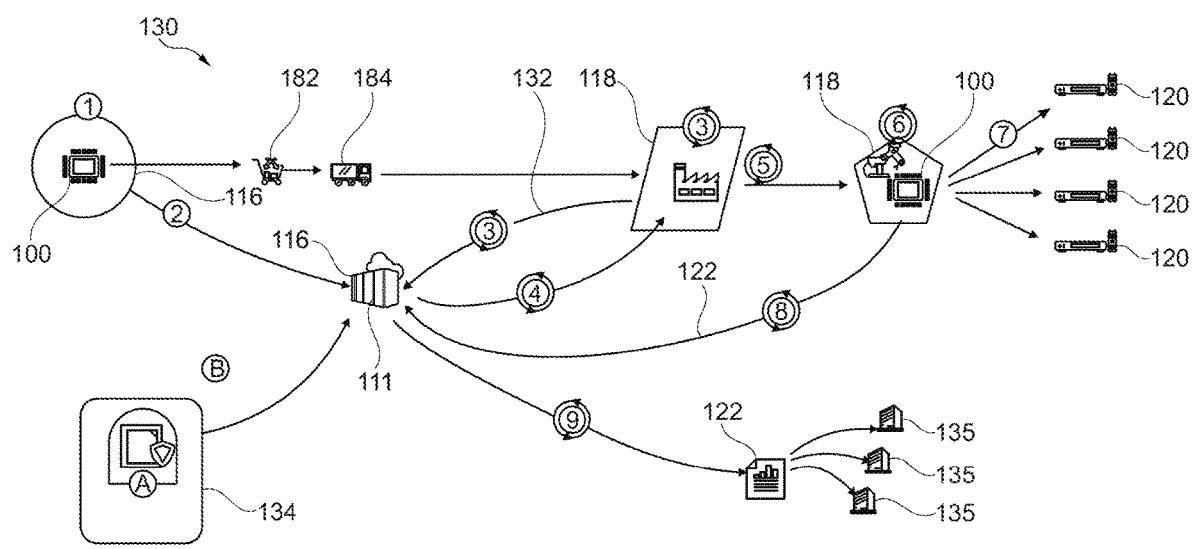
FIG. 5 illustrates an arrangement for customizing a security-sensitive semiconductor product according to an exemplary embodiment.

FIG. 5 illustrates an arrangement 130 for customizing a security-sensitive semiconductor product 100 according to an exemplary embodiment. FIG. 5 illustrates an overview of a security-compliant supply chain architecture according to an exemplary embodiment. More specifically, FIG. 5 shows arrangement 130 with an overall supply chain flow where the security personality of a system-on-a-chip (SoC)-type semiconductor product 100 is decided at an OEM-type product recipient entity 118.

Various processes executed during operation of arrangement 130 are indicated with numbers 1 to 9 and A, B in FIG. 5. These processes will be explained in the following in further detail:

In process 1, product supplier entity 116 produces a generic part in form of customizable semiconductor component 100, which contains keys and assets for multiple CA (Conditional Access) vendors. The generic customizable semiconductor product 100 can be shipped to a product recipient entity 118 before CA chip certifications have been completed. Most keys may be disabled and never utilized. Each CA vendor may decide in which personalities their keys may be enabled.

Now referring to a process 2, a security division of product supplier entity 116 may upload an activation map for the security personality to a supplier portal 111 of product supplier entity 116. The activation map may comprise a bitstring or array or similar data structure identifying functional blocks that are to be activated (e.g. {0, 1, 1, 0, 1, 0, etc.}) and/or in some implementations, an order of processing or flow of data through functional blocks (e.g. {B, A, E, F, etc.}). For example, an activation map may comprise an ordered list of activated functional blocks; tuples of activation states and subsequent blocks; or any other such format. Supplier portal 111 may communicate in the way as described in the following in the communications network according to FIG. 5. For example, such a supplier portal 111 may be constructed as disclosed for example in U.S. Pat. Nos. 9,767,319; 9,904,809; and 11,070,876, which are incorporated by reference herein in their entirety.

Process 3: The product recipient entity 118 requests the required security personality from the supplier portal 111 of product supplier entity 116. The personality is programmed using activation map which is delivered inside a license of supplier portal 111. Initially only one personality may be available from the supplier portal 111. As shown with reference sign A, at least one security service provider entity 134 (for example a CA vendor) may form part of the arrangement 130 and may be configured for cooperating with the product supplier entity 116 for certifying a security configuration of the semiconductor product 100. As indicated by reference sign B, product supplier entity 116 may upload CA certified personality into supplier portal 111. As chip certifications are completed with each CA vendor, the corresponding personality may be added to the supplier portal 111. Security personality programming may be permanent; once the personality programming is complete, the corresponding chip-type semiconductor product 100 may be locked to that CA personality. Depending on the security personality, an optional CA vendor approval may be required when the product recipient entity 118 requests a license. This may be handled within the supplier portal 111 in the same way as other third party approvals.

Now referring to processes 4-7, the product recipient entity 118 receives—in process 4—licenses from supplier portal 111 and is able to activate customizable semiconductor products 100 with the required security personality. In process 5, the licenses are forwarded from product recipient entity 118 to the respective generic customizable semiconductor product 100. Referring to process 6, supplier portal 111 may activate all licenses and may permanently activate one personality for a semiconductor product 100. According to process 7, original equipment 120 may be manufactured on the basis of the customized semiconductor products 100. Customization may be done in accordance with the application of the respective semiconductor product 100 in the framework of the respective original equipment 120. Referring to the four examples of original equipment 120 shown in FIG. 5, these examples relate to a set-top box with a certain personality, a set-top box with a first conditional access, a set-top box with a second conditional access, and a set-top box with a third conditional access.

In a subsequent process 8, a supplier server, for instance on the production line of the product recipient entity 118, may generate reports 122 of CA keys that have been enabled and disabled. For example, a generated report 122 may be indicative of semiconductor products 100 being customized, semiconductor products 100 being non-customized, and permanently deactivated security assets of semiconductor products 100 being customized being available for re-use. The product recipient entity 118 may pull such a report 122 from the supplier server and may push it into the supplier portal 111 in a timely manner.

Now referring to process 9, once the product recipient entity 118 uploads the reports 122 into supplier portal 111, CA stakeholders (see reference sign 135) can download a list of enabled/disabled security assets.

With regard to the process indicated with reference sign A, CA chip certifications may use a generic semiconductor product 100 with a CA-specific activation map applied. In the exceptional case that an issue with a generic OTP (one-time programmable) configuration is found during certification, a new generic part number may be used.

Referring to process B, once the CA chip certification is complete, the agreed activation map may be uploaded to the supplier portal 111 and may be made available to the product recipient entity 118.

Figure 6:
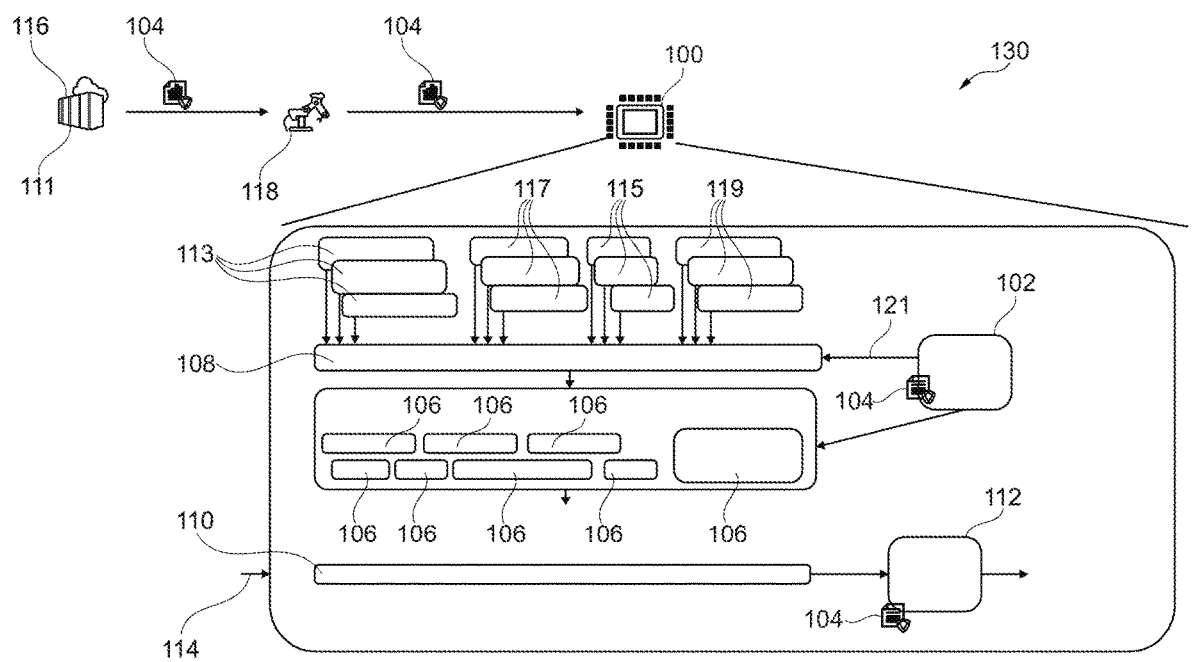
FIG. 6 illustrates a semiconductor product being customizable according to an exemplary embodiment.

FIG. 6 illustrates a semiconductor product 100 being customizable according to an exemplary embodiment.

The semiconductor product 100 according to FIG. 6 may be integrated in an arrangement 130, as described above. Referring specifically to FIG. 6, product supplier entity 116 may provide a framework with different security personalities. Product recipient entity 118 may provide an infrastructure responsible for asking a semiconductor product 100 to set its personality.

As already described above, semiconductor product 100 may comprise a customizing unit 102, which may here be embodied as a secure unit (e.g. with self-destructive features to prevent tampering or inspection, with encoded cryptographic secrets, etc.). A validated customizing data structure 104, which may include a security personality of the semiconductor product 100, may be supplied to the customizing unit 102 for customizing semiconductor product 100. Upon receipt of such a customizing data structure 104, the customizing unit 102 may validate the customizing data structure 104 (e.g. by verifying a signature of the data structure, etc.). After successful validation, the customizing unit 102 may configure (see reference sign 121) and thereby convert, upon customizing, a state of a first permanent memory 108 of the semiconductor product 100 into a permanent state. In particular, customizing unit 102 may customize semiconductor product 100 by, for example, programming hardware units such as electrical fuses, gates, flash cells, registers, flip-flops, OTP (one-time programmable) cells, etc. By programming hardware cells, transistors may for example be set to a permanent state. Signals indicative of the set state of the hardware units may then propagate between different entities of the semiconductor product 100. The customization may therefore be carried out using logic circuits and other hardware elements, which may also be at least partially embodied in a hard-wired configuration. Said permanent state may enable/disable certain security features. For example, first permanent memory 108 may be configured only once, thereafter its state is permanent. For instance, the permanent state of the first permanent memory 108 may be influenced by one or more of one-time programmable (OTP) keys 113, for instance an OTP key 1, OTP key 2 and OTP key 3. It is also possible that the permanent state of the first permanent memory 108 is influenced by one or more of intellectual property (IP) elements 115, for instance IP A, IP B and IP C. Various other options 117 and features 119 may be used additionally or alternatively for influencing the permanent state of the first permanent (or non-volatile) memory 108. For example, when the semiconductor product 100 is customized or configured, the state of an activated OTP key may be permanent.

Apart from this, a plurality of functional blocks 106 may be provided in an interior of semiconductor product 100 which may be functionally coupled with first permanent memory 108. For instance, functional blocks 106 which may be individuality activated or deactivated may comprise a key ladder block, a video block, an audio block, a DRM/CA IPs block, a DRM/CA IPs block, an OTP programming block, a crypto block, etc. Each of the functional blocks 106 may have an application-specific function and may be individuality activated or deactivated upon customizing semiconductor product 100. Thereby, the functionality activated in the previously generic semiconductor product 100 may be adjusted to a specific application of the customized semiconductor product 100 in accordance with a use of the customized semiconductor product 100 intended by product recipient entity 118. Advantageously, customizing unit 102 may block or deactivate all blocks 106 until the semiconductor product 100 is personalized, i.e. is provided with a security personality by customization. Hence, if not personalized, the customizing unit 106 blocks all operations/ modules relating to functional blocks 106. When the semiconductor product 100 is customized, a selected subset of the described security and non-security features is available according to the permanent state personality.

Furthermore, FIG. 6 illustrates that semiconductor product 100 has a final setting unit 112 configured for finalizing a setting of the semiconductor product 100 after receipt of the customizing data structure 104 by product supplier entity 116 and upon receipt of a finalizing request 114 by product recipient entity 118. More specifically, the final setting unit 112 is capable of deactivating the semiconductor product 100 unless a finalizing request 114 is received which meets at least one validity criterion. By a valid finalizing request 114, the final setting unit 112 is configured for converting a second permanent memory 110 of the semiconductor product 100 into a permanent state for finalizing the setting. Thus, the product recipient entity 118 may complete customization of semiconductor product 100. Hence, an extra permanent stage of the second permanent memory 110 may be set by the product recipient entity 118, for instance at the end of the production (for example for finalizing customization of semiconductor product 100 on completion of the manufacture of original equipment 120 comprising customized semiconductor product 100). Final setting unit 112 coupled with second permanent memory 110 may for instance be a secure unit. For example, final setting unit 112 may block all functional features of semiconductor product 100 if the wrong final state is indicated by finalizing request 114. In embodiments, customizing unit 102 and final setting unit 112 may be separate entities, in particular separate hardware blocks. In another embodiment, customizing unit 102 and final setting unit 112 may be a common identical entity, for instance a common hardware block. Correspondingly, customizing data structure 104 and finalizing request 114 may be separate data structures, files or communication messages. In another embodiment, customizing data structure 104 may be the same as finalizing request 114. For instance, customizing data structure 104 and finalizing request 114 may be a common or identical data structure, a common or identical file, or a common or identical communication message.

By finalizing request 114, product recipient entity 118 (or any other non-trusted entity) may be enabled to finalize the setting of the customization. However, upon receipt of a finalizing request 114, final setting unit 112 may assess whether the instructions included in finalizing request 114 concerning the setting of second permanent memory 110 match with an expected configuration according to customizing data structure 104. Depending on a result of said assessment, final setting unit 112 may accept or reject instructions included in finalizing request 114.

Exemplary embodiments, and in particular the design of a semiconductor product 100 such as the one shown in FIG. 6 may rely on hardware and/or software elements. In particular, hardware mechanisms may be implemented in exemplary embodiments (and in particular in the design of a semiconductor product 100) to assure confidentiality, integrity and/or authenticity of the customizing data structure 104. Furthermore, hardware elements may be implemented to ensure the integrity of first permanent memory 108 and/or second permanent memory 110. In particular, such hardware elements may implement an access control to all units, elements or entities in the system on a chip (SoC) defining, per unit, element or entity, what it is allowed to read and/or write. For example, only secure entities such as customizing unit 102 and/or final setting unit 112 may be allowed to change register states (i.e. may have read and write access concerning hardware cells), whereas other entities (which are not considered as secure entities, for example an operational system) may be only allowed to read, but not to write, register states (i.e. may have read access, but not write access, concerning hardware cells). Read and/or write access by the various entities may be controlled by hardware for protecting a customized configuration. In this context, any hardware may be implemented which may contain or may not contain firmware (for instance a central processing unit (CPU), a microcontroller, etc.), that can access parts of the system (in particular internal or external to the SoC). For example, it may be through a combination of hardware and firmware running in secure units (such as customizing unit 102 and/or final setting unit 112) that the access control is defined per unit, element or entity. For instance, the access control can be configured per unit, element or entity (secure and/or non-secure). Examples of access can be a secure bus or a non-secure bus, an internal or external memory (which can be a secure or non-secure memory), functionalities (for instance if USB [Universal Serial Bus] can be used by a certain element), sensors, cryptography blocks, etc.

The below table provides examples of the type of hardware that can be used in an embodiment for achieving the previously mentioned functions. The last column gives examples of alternative methods and systems which can achieve the same goal.

|   | Exemplary embodiment | Other embodiments |
|---|---|---|
| Confidentiality | Can be done through encryption. In one embodiment, hardware cryptographic engines (such as AES [Advanced Encryption Standard]) may be used. Additionally, it may be possible to choose crypto to implement a hardware countermeasure to resist attacks by non-authorized entities, and hardware is particularly robust. | This can be implemented using software, such as firmware, and/or hardware. Encryption can be achieved through any cryptographic algorithm (for example AES, Triple Data Encryption Algorithm [TDES], Rivest-Shamir-Adleman [RSA], etc.) |
| Integrity | May be achieved by hardware that can perform digests (for example Secure Hash algorithm [SHA]) to the configuration. | There are many different types of digests which can be implemented, like SHA, Message Digest Algorithm 4 (MD4), Hash-based Message Authentication Code (HMAC), etc. Any of these can be performed in hardware and/or software, such as firmware |
| Authenticity | To ensure that the message (data structure) came from a trusted source, it may be possible to use a Public Key Accelerator hardware to perform a public cryptographic operation (such as RSA) to authenticate the data structure. | This can be implemented using software, such as firmware, and/or hardware. There are many different ways to authenticate data blobs. For example, RSA, Elliptic Curves, HMAC, Advanced Encryption Standard-Galois/Counter Mode (AES-GCM), etc |
| Availability | This may be achieved by hardware elements (such as physical wires, gates, transistors). In this way, it may be guaranteed that the configuration state is always available. | This may be achieved with hardware or software, such as firmware, running internally to the SoC to guarantee that the data is always available. |
| Access Control | Each element may have an Access Control List (ACL) implemented in hardware. For each transaction or request, it may be possible to compare the source element against the configured ACL. If allowed, then a hardware may allow the element to perform the transaction or request. If not allowed, the transaction or request may be blocked and/or denied. In an embodiment, it may be possible to perform all the ACL functionality in hardware. The ACL configuration can come from hardware or software, such as firmware. | Many different embodiments may be implemented to perform ACL. An ACL being appropriate for a specific application may be selected in accordance with the architecture of an SoC fabric. |

Figure 7:
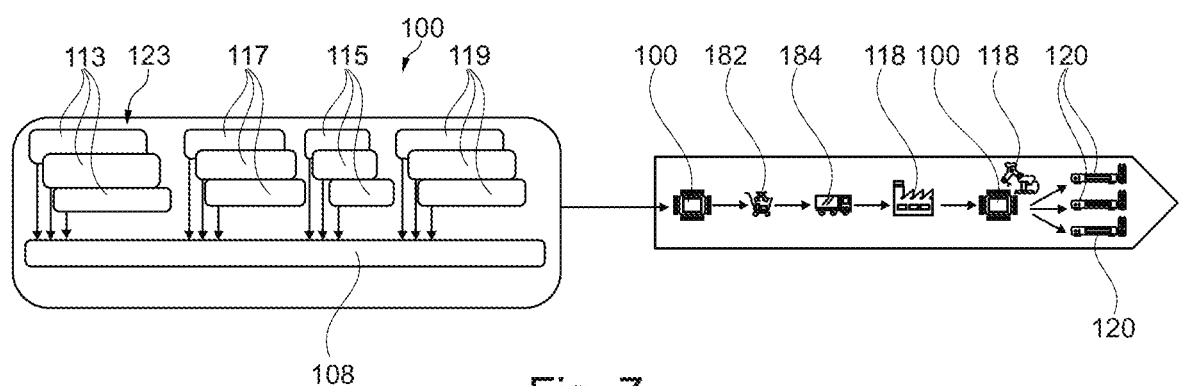
FIG. 7 illustrates a system for customizing a generic semiconductor product into a customized specific semiconductor product according to an exemplary embodiment.

In the following, referring to FIG. 7 to FIG. 15, several advantageous aspects of exemplary embodiments will be explained. Each of said aspects may be realized individually and independently from the others, while it is also possible in other embodiments to combine two or more or even all of said and/or other aspects. Preferred ones of these advantageous aspects are the following:

FIG. 7 illustrates a system for customizing a generic semiconductor product 100 into a customized specific semiconductor product 100 according to an exemplary embodiment.

According to FIG. 7, a reduction of the effort in terms of manufacture and supply chain may be achieved by providing generic customizable semiconductor products 100, which can be configured to assume one of a plurality of selectable specific customized states. Contrary to approaches not utilizing implementations of the systems and methods discussed herein in which product recipient entities have to order dedicated parts which can only work in specific applications (i.e. cannot be re-used), exemplary embodiments allow product recipient entities 118 to re-use a stock across multiple security applications.

The generic system-on-a-chip (SoC) according to FIG. 7 shows a plurality of keys from multiple security vendors programmed in one semiconductor product 100 (compare reference sign 123). The illustrated keys may for example be or comprise OTP keys 113. The first permanent memory 108 may be in a dormant state as long as semiconductor product 100 is in a customizable non-customized state. Individual functional blocks (see for example reference signs 106 in FIG. 6) of semiconductor product 100 can be individually enabled or disabled when being customized at a product recipient entity 118. Hence, a semiconductor product 100 with all functional blocks 106 deactivated may be customized by providing a license or customizing data structure 104 by product supplier entity 116. Hence, only by providing a security personality in the production line, some of the previously dormant functional blocks 106 may be activated.

Figure 8:
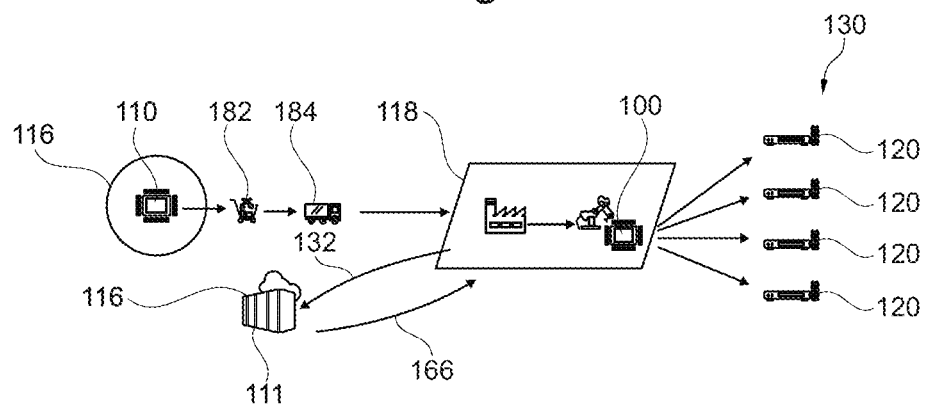
FIG. 8 illustrates a system for customizing a semiconductor product with single security personality or multi-security personalities according to an exemplary embodiment.

FIG. 8 illustrates a system for customizing a semiconductor product 100 with single security personality or multi-security personalities according to an exemplary embodiment.

The embodiment of FIG. 8 ships generic security semiconductor products 100 which can be converted to a single or multi-security personality or profile by a product recipient entity 118. Thus, generic customizable security-sensitive semiconductor products 100 may be provided.

By a customizing request 132, a security personality for a semiconductor product 100 to be customized may be requested. By a customizing data structure transmission message 166, the requested security personality or customizing data structure 104 may be provided from the product supplier entity 116 to the product recipient entity 118.

Figure 9:
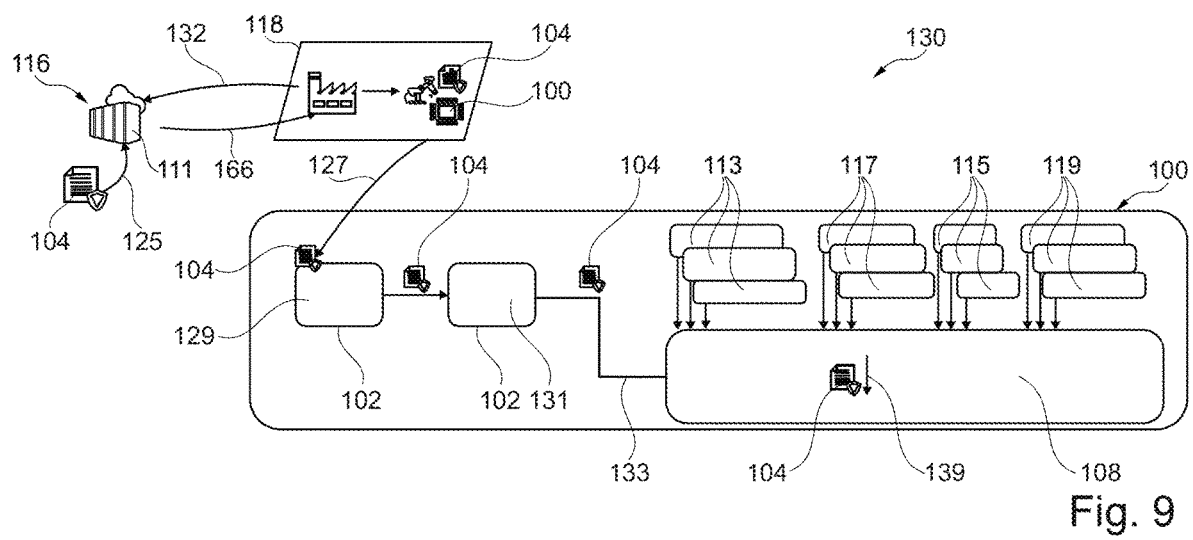
FIG. 9 illustrates a system for customizing a semiconductor product at a location of a product recipient entity according to an exemplary embodiment.

FIG. 9 illustrates a system for customizing a semiconductor product 100 at a location of a product recipient entity 118 according to an exemplary embodiment.

Advantageously, the embodiment of FIG. 9 allows an enablement of security profiles of customizable semiconductor products 100 at a product recipient entity 118. Such an embodiment may involve the ability to create multiple security profiles at a production line of a product recipient entity 118 while still meeting security partner certifications and/or other requirements.

The generic SoC-type semiconductor product 100 according to FIG. 9 is customized by software of product supplier entity 116 in the production line of product recipient entity 118 sending a required personality to the semiconductor product 100, see reference sign 127. As indicated by reference sign 125, product supplier entity 116 uploads all different personalities to supplier portal 111. Again referring to semiconductor product 100, a customizing data structure 104 used for customizing and providing a security personality may be transmitted through a first secure layer 129 and a second secure layer 131 towards first permanent memory 108. A permanent program configuration as activation map file is indicated by reference sign 133. First permanent memory 108 may be in a dormant stage and can be enabled or disabled at product recipient entity 118. In a permanent state thereof, security may be enabled or disabled. A transition between the dormant state and the permanent state is indicated by reference sign 139.

Advantageously, enabling a security profile may be carried out at the premises of the product recipient entity 118, advantageously without the requirement to acknowledge product recipient entity 118 as a trusted party. Since the product supplier entity 116 provides the entire framework for activating (for instance in the form of software which may for instance be provided in a cloud, and in the form of customizing data structures 104 or licenses) a semiconductor product 100, the entire control power is with product supplier entity 116 so that product recipient entity 118 does not need to be a trusted party.

Figure 10:
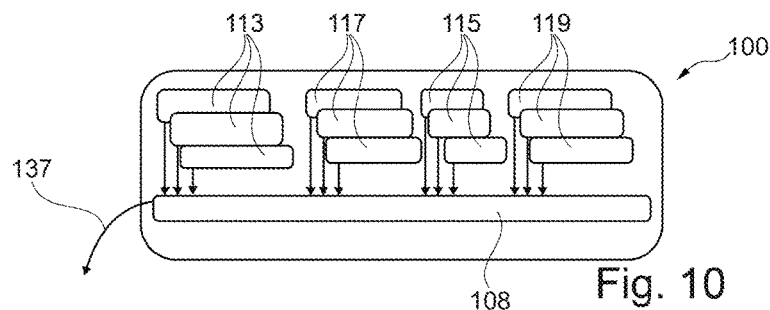
FIG. 10 illustrates a system for customizing a semiconductor product with multi-security combinations according to an exemplary embodiment.

FIG. 10 illustrates a system for customizing a semiconductor product 100 with multi-security combinations according to an exemplary embodiment.

A gist of the embodiment of FIG. 10 is the provision of multi-security combinations in a customizable semiconductor product 100. This may involve the ability to create multi-security combinations (i.e. multi conditional access and digital rights management) using a generic customizable semiconductor product 100. In FIG. 10, reference sign 137 indicates that keys from multiple IPs and assets from security vendors may be enabled.

Figure 11:
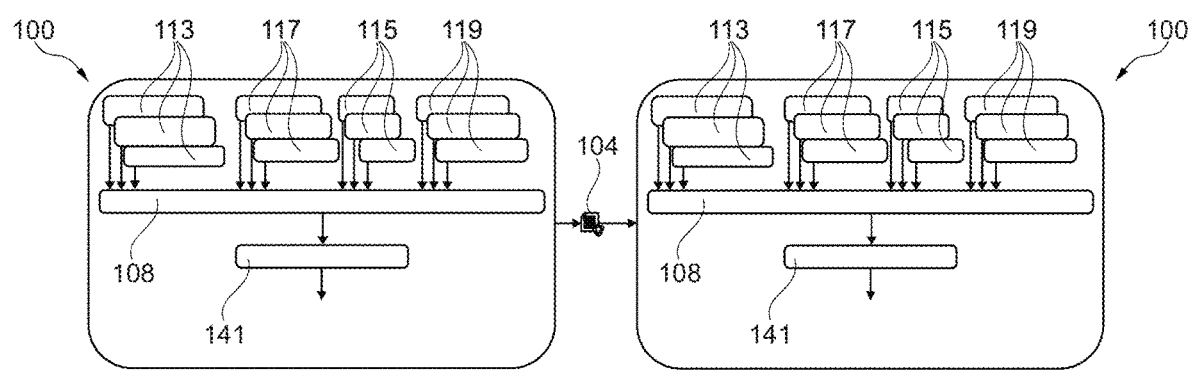
FIG. 11 illustrates a system for customizing a semiconductor product having functional blocks being deactivated by default according to an exemplary embodiment.

FIG. 11 illustrates a system for customizing a semiconductor product 100 having functional blocks being deactivated by default according to an exemplary embodiment.

In the embodiment of FIG. 11, a customizable semiconductor product 100 is shown on the left-hand side which is deactivated by default. In particular, security-sensitive semiconductor products 100 may be shipped which are not activated. This may be achieved by blocking key chipsets features by default, wherein such a default mode may be overcome by providing a security personality to the semiconductor products 100 (for instance by a customizing data structure 104). While the semiconductor product 100 on the left-hand side is a generic SoC without personality, the semiconductor product 100 on the right-hand side is a generic SoC with personality.

Again referring to the semiconductor product 100 on the left-hand side of FIG. 11, security operations 141 may be blocked by hardware and security firmware. In contrast to this, in the semiconductor product 100 on the right-hand side of FIG. 11, security features are available according to the permanent state personality. When a semiconductor product 100 leaves product supplier entity 116, all security parts may be blocked until the semiconductor product 100 receives a security personality.

Figure 12:
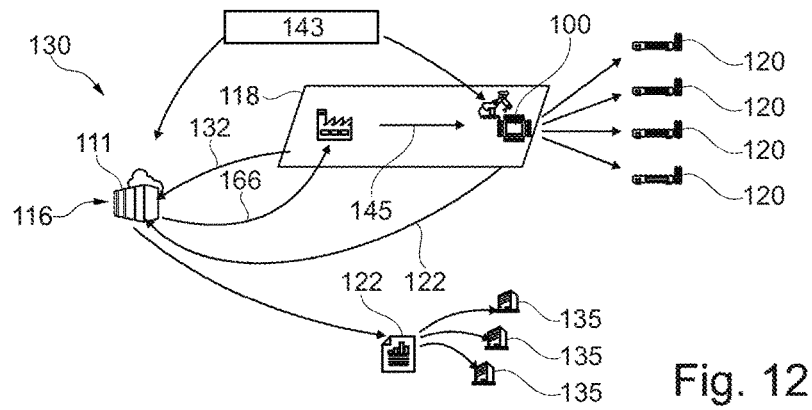
FIG. 12 illustrates a system for customizing a semiconductor product by an untrusted product recipient entity according to an exemplary embodiment.

FIG. 12 illustrates a system for customizing a semiconductor product 100 by an untrusted product recipient entity 118 according to an exemplary embodiment.

Referring to FIG. 12, a product recipient entity 118 may continue to remain an untrusted party without loss of security. This may be achieved by providing an activation or a customizing mechanism for activating or customizing a generic semiconductor product 100 to enable chipsets features which does not rely on a product recipient entity 118.

As indicated by reference sign 143, all infrastructure and software used for providing customizing data structure 104 or security personality 145 can be provided by product supplier entity 116.

Advantageously, the product recipient entity or entities 118 do not have to be trusted parties from the perspective of product supplier entity 116. This allows to perform critical actions at premises of product recipient entity 118 without having to trust it. This may be achieved by a system architecture according to which product supplier entity 116 provides all security elements and tools needed to achieve security of customizing semiconductor products 100.

Figure 13:
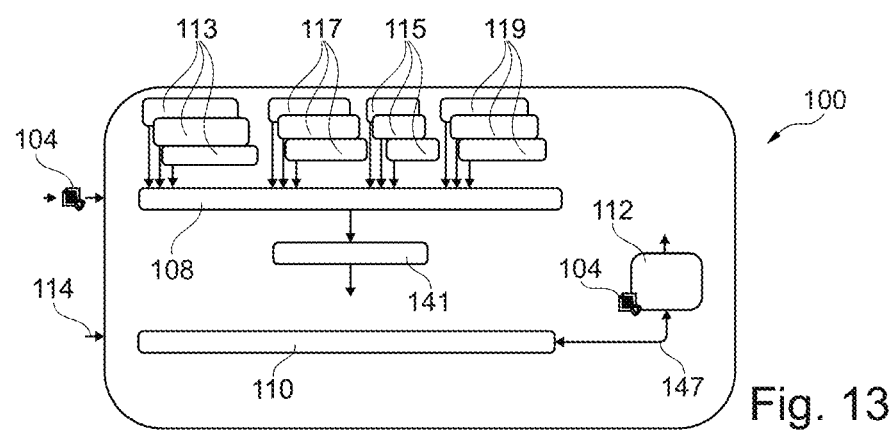
FIG. 13 illustrates a system for customizing a semiconductor product that enables a product supplier entity to monitor a security configuration according to an exemplary embodiment.

FIG. 13 illustrates a system for customizing a semiconductor product 100 that enables a product supplier entity 116 to monitor a security configuration according to an exemplary embodiment.

FIG. 13 illustrates the option to monitor the security configuration of a customized semiconductor product 100 (for instance an SoC with personality). According to such an embodiment, it may be possible to provide monitoring tools which detect a final configuration of a customizable semiconductor product 100 in accordance with a product recipient entity's 118 needs, wherein semiconductor product features (in particular chipsets features) may be disabled if not correctly employed.

FIG. 13 includes a product as described above in connection with FIG. 6. Final setting unit 112 which is here configured as secure layer may for example monitor a final state in comparison with a reference. This is indicated by reference sign 147. If a final state is wrong (e.g. not corresponding to an expected test output, or not matching a configuring data structure), functional features 106 or other SoC features may be blocked by final setting unit 112. By providing finalizing request 114, product recipient entity 118 is provided with an extra security feature to close the customized semiconductor product 100 when it leaves the production line. If customized semiconductor product 100 is not closed by finalizing request 114, product supplier entity 116 has the possibility to block the semiconductor product 100, for instance to avoid misuse. Hence, product supplier entity 116 can render a customized semiconductor product 100 non-operative if product recipient entity 118 has not added extra security by transmitting a finalizing request 114.

Figure 14:
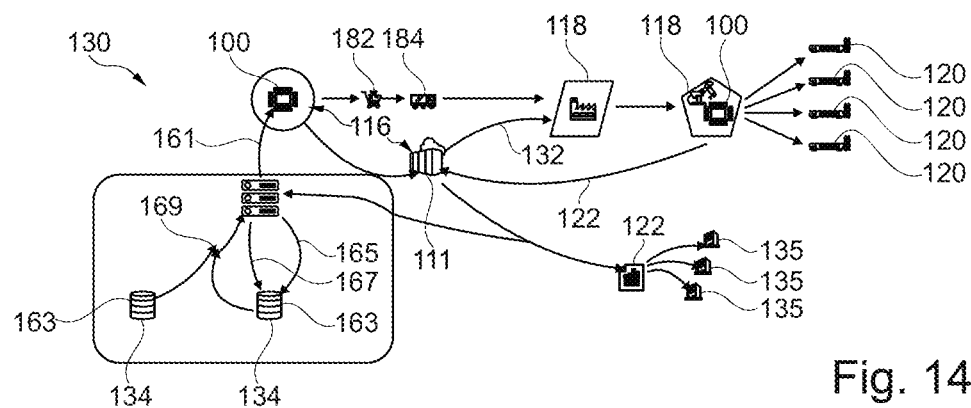
FIG. 14 illustrates a system for customizing a semiconductor product capable of re-using disabled security assets according to an exemplary embodiment.

FIG. 14 illustrates a system for customizing a semiconductor product 100 capable of re-using disabled security assets according to an exemplary embodiment.

With the embodiment of FIG. 14, there is the option to re-use disabled security assets. When a particular security asset (for example a key) is permanently disabled in a customized semiconductor product 100, it may be possible to re-use such a non-used or permanently disabled security asset in another semiconductor product 100 (for example chipset) which will go through the production at the side of the product supplier entity 116.

Reference sign 161 shows that keys are programmed in semiconductor product 100. Keys may be provided by one or more key pools 163 (which may relate for example to a security service provider entity 134). When a report 122 indicates that a key or an identifier has been disabled in a customized semiconductor product 100, said key or identifier may be re-used for another semiconductor product 100 (see reference sign 165). When however the key or identifier has been enabled in a customized semiconductor product 100, said key or identifier may be deleted from the corresponding database or key pool 163 (see again reference sign 165). According to reference sign 167, new keys or identifiers may be saved in a key pool 163. Now referring to reference sign 169, if a key or an identifier has been marked for re-use, then one of the shown key pools 163 may be used, else the other key pool 163 may be used.

Hence, if a security asset (for example a key or an identifier) is permanently disabled in a semiconductor product 100, such a security asset is not used in this semiconductor product 100. For example, more than 90% of the security assets of the customizable semiconductor product 100 may be unused after customization. Since the product supplier entity 116 owns the entire framework and controls the entire supply chain, product supplier entity 116 knows (in particular from reports 122) which security assets are permanently disabled. Such permanently disabled security assets may remain or may be collected in a database and may be used for the production of next semiconductor products 100. Consequently, a highly efficient use of security assets may be achieved while at the same time ensuring that no clones (i.e. no devices with identity keys) are in the market. Hence, efficiency and security may be combined synergistically.

Figures 15, 16:
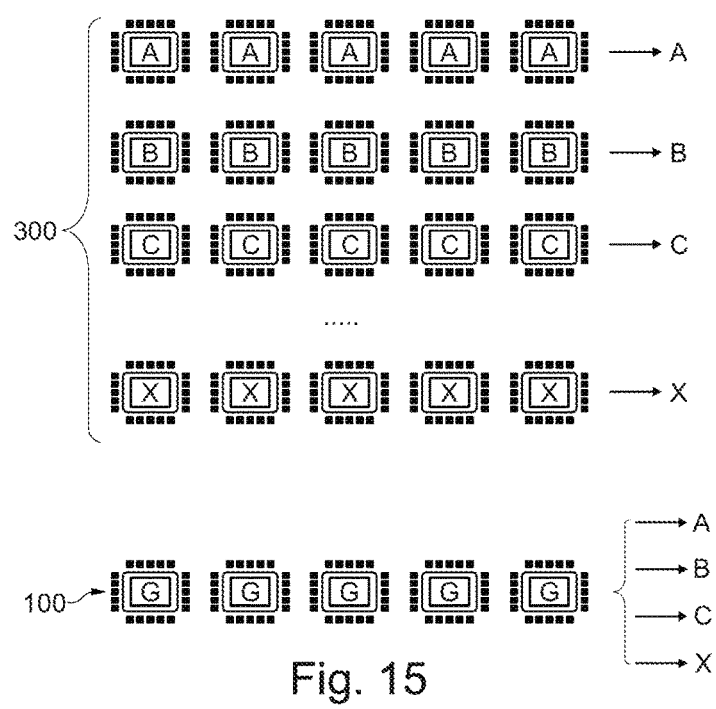
FIG. 15 illustrates a plurality of fixedly customized semiconductor products and customizable semiconductor products according to an exemplary embodiment protected against misuse.
FIG. 16 illustrates a flowchart of a method of customizing a security-sensitive semiconductor product according to another exemplary embodiment.

FIG. 15 illustrates a plurality of fixedly customized semiconductor products 300 and customizable semiconductor products 100 according to an exemplary embodiment protected against misuse.

According to an exemplary embodiment, semiconductor products 100 may be provided in a disabled-by-default configuration, which can only be enabled using tools controlled by the product supplier entity 116. As a result, it will be difficult if not impossible for product recipient entities 118 to sell the stock in an unauthorized way, for instance to the black market.

As shown in FIG. 15, each of specific semiconductor products 300 may be specifically adapted for a certain application A, B, C, . . . , X. If for example a project relating to application A stops, each of said specific semiconductor products 100 adapted for application A may be sold for this application A to hackers or other non-authorized organizations. This involves security issues.

In contrast to this, customizable semiconductor products 100 according to exemplary embodiments can be customized so as to be usable for any of selectable applications A, B, X. If for example a project relating to application A stops, the generic semiconductor products 100 can still be flexibly adapted for applications B, C, . . . , X, so that there is no motivation to sell them to non-authorized organizations.

Furthermore, customizable semiconductor products 100 according to exemplary embodiments may be disabled by default until they are customized. Descriptively speaking, the customizable semiconductor products 100 may be purely non-operational until a security personality is added. Hence, the generic semiconductor products 100 may be completely deactivated and can only be used when activated by product supplier entity 116. This makes it more difficult to sell such customizable semiconductor products 100 to the black market.

Further advantageously, it may be possible to provide an arrangement 130 of product supplier entity 116, product recipient entity 118 and customizable semiconductor products 100 in a blockchain configuration. Hence, the communication architecture among the mentioned nodes may be distributed rather than central. Each of the nodes may have a certain assigned role. In such an architecture, the entire activation and/or deactivation and/or control processing may serve as the access-control layer for such a blockchain, which may support permission and profile maintenance.

Still referring to the above-described blockchain architecture, a private blockchain allows only selected entry of verified participants (for example CA vendors in the present case). An operator has the right to override, edit, or delete the necessary entries on the blockchain (e.g. by providing new replacement values).

A permissioned blockchain may maintain an access control layer to allow certain actions to be performed only by certain identifiable participants. A permissioned blockchain is useful in here, for which security, identity and role definition may be advantageous.

A private blockchain may allow only selected set-top boxes (or other original equipment 120) to participate in the network. For example, an operator may be running a private blockchain operated through a designated number of set-top boxes (or other original equipment 120) internal to itself. In contrast, permissioned blockchains may allow someone (for example CA vendors) to join the network once their identity and role are defined. An operator may use a permissioned blockchain to deal with multi-party activations or deactivations. These activations or deactivations that occur on such a blockchain may involve product recipient entities 118, CA vendors, operators and chip vendors in the operation and processing cycle. These external parties (to operator), although a part of the overall system, may not know the intended service usages or business terms at which the operator provides the assembled data service to various clients (which can be some of these parties). The use of permissioned blockchain allows such role-limited implementations. The service items for a permissioned blockchain may choose to make a few items, like activated features and configurations, available for any permitted parties on the network to read from the system. However, only select participants (for example activated CA) may be allowed to view the actual configuration details (for example data offered to these participants as a service).

FIG. 16 illustrates a flowchart 400 of a method of customizing a security-sensitive semiconductor product 100 according to an exemplary embodiment. Concerning the reference signs used for the following description of FIG. 16, reference is made in particular to FIG. 2, FIG. 5 and FIG. 6.

Referring to a block 402, the method may comprise supplying the customizable security-sensitive semiconductor product 100 by a product supplier entity 116.

Referring to a block 404, the method may comprise transmitting to the security-sensitive semiconductor product 100 a customizing data structure 104 created by the product supplier entity 116 to customize the supplied security-sensitive semiconductor product 100 in accordance with a specified application of the supplied semiconductor product 100.

Referring to a block 406, the method may comprise customizing a configuration of the supplied security-sensitive semiconductor product 100 based on the customizing data structure 104 and in accordance with the specified application.

Hence, a main difference between the embodiment of FIG. 1 and the embodiment of FIG. 16 is that, according to FIG. 16, no product recipient entity 118 needs to be involved in the execution of the method. The product supplier entity 116 can carry out the entire customization alone.

More generally, product supplier entity 116 and product recipient entity 118 can be a unique entity in exemplary embodiments. Although in the aforementioned figures, product supplier entity 116 and product recipient entity 118 are represented as separate entities, there can be just product supplier entity 116 communicating directly with semiconductor product 100 in another embodiment.

It should be noted that certain passages of this disclosure may reference terms such as "first" and "second" in connection with devices, mode of operation, transmit chains, etc., for purposes of identifying or differentiating one from another or from others. These terms are not intended to merely relate entities (for instance, a first device and a second device) temporally or according to a sequence, although in some cases, these entities may include such a relationship. Nor do these terms limit the number of possible entities (for instance, devices) that may operate within a system or environment.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

Having now described some illustrative embodiments, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed only in connection with one implementation are not intended to be excluded from a similar role in other embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one implementation, the systems and methods described herein consist of one, each combination of more than one, or all of the described elements, acts, or components.

Any references to embodiments or elements or acts of the systems and methods herein referred to in the singular can also embrace embodiments including a plurality of these elements, and any references in plural to any implementation or element or act herein can also embrace embodiments including only a single element. References in the singular or plural form are not intended to limit the presently disclosed systems or methods, their components, acts, or elements to single or plural configurations. References to any act or element being based on any information, act or element can include embodiments where the act or element is based at least in part on any information, act, or element.

Any implementation disclosed herein can be combined with any other implementation, and references to "an implementation," "some embodiments," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the aspects and embodiments disclosed herein.

References to "or" can be construed as inclusive so that any terms described using "or" can indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein can be embodied in other specific forms without departing from the characteristics thereof. The foregoing embodiments are illustrative rather than limiting of the described systems and methods. The scope of the systems and methods described herein can thus be indicated by the appended claims, rather than the foregoing description, and changes that come within the meaning and range of equivalency of the claims are embraced therein.

We claim:

1. A semiconductor product, comprising:
   a customizing unit configured for customizing the semiconductor product into one of a plurality of different customized configurations selected by a received customizing data structure specifying a selected application of the semiconductor product, wherein the semiconductor product comprises a supplied security-sensitive semiconductor product from a product supplier entity to a product recipient entity;
   a data structure created by the product supplier entity to customize the supplied security-sensitive semiconductor product in accordance with an application of the supplied semiconductor product specified by the product recipient entity; and
   wherein a configuration of the supplied security-sensitive semiconductor product is customized based on the data structure and in accordance with the specified application;
   and a plurality of functional blocks each configured for providing an assigned functionality and all being deactivated when the semiconductor product is not in one of the customized configurations;

wherein the customizing unit is configured for activating only a subgroup of the functional blocks based on the received customizing data structure, wherein the semiconductor product is configured with multi-security feature resources allowing the product supplier entity to customize the semiconductor product with at least two different security features by activating at least part of the multi-security feature resources.

2. The semiconductor product according to claim 1, wherein the semiconductor product has integrated resources providing the plurality of customized configurations.

3. The semiconductor product according to claim 1, wherein the plurality of customized configurations are secure customized configurations.

4. The semiconductor product according to claim 1, comprising a final setting unit configured for finalizing a setting of the semiconductor product after receipt of the customizing data structure and upon receipt of a finalizing request.

5. A semiconductor product, comprising:
a customizing unit configured for customizing the semiconductor product into one of a plurality of different customized configurations selected by a received customizing data structure specifying a selected application of the semiconductor product; and
a plurality of functional blocks each configured for providing an assigned functionality and all being deactivated when the semiconductor product is not in one of the customized configurations;
wherein the customizing unit is configured for activating only a subgroup of the functional blocks based on the received customizing data structure; and
a final setting unit configured for finalizing a setting of the semiconductor product after receipt of the customizing data structure and upon receipt of a finalizing request, wherein the final setting unit and the customizing unit are one common unit.

6. The semiconductor product according to claim 5, wherein at least part of the functional blocks is configured for providing an application-specific functionality; and
wherein the customizing unit is configured for activating only a subgroup of the functional blocks providing the application-specific functionality in accordance with the selected application specified by the received customizing data structure.

7. The semiconductor product according to claim 5, wherein at least part of the functional blocks provides a security function; and
wherein the customizing unit is configured for activating at least one of the functional blocks providing a security function based on the received customizing data structure.

8. The semiconductor product according to claim 5, wherein the customizing unit is configured for customizing the semiconductor product only upon receiving and validating the customizing data structure.

9. The semiconductor product according to claim 5, wherein the customizing unit is configured for customizing the semiconductor product in accordance with a customized configuration including a security personality provided by the customizing data structure.

10. The semiconductor product according to claim 5, wherein the final setting unit is capable of deactivating the semiconductor product unless the finalizing request is received which meets at least one validity criterion.

11. The semiconductor product according to claim 5, wherein the semiconductor product is configured as a security-sensitive semiconductor product in which at least a part of the functional blocks provides security features of the semiconductor product.

12. The semiconductor product according to claim 5, wherein the semiconductor product is in a customizable configuration.

13. The semiconductor product according to claim 5, wherein the semiconductor product is in one of the customized configurations.

14. The semiconductor product according to claim 5, wherein the customizing data structure comprises at least one of the group consisting of at least one customizing file and at least one customizing message.

15. The semiconductor product according to claim 5, wherein the customizing unit is one of the group consisting of a secure customizing unit and a non-secure customizing unit.

16. The semiconductor product according to claim 5, wherein the customizing unit is configured for re-customizing the semiconductor product after customizing.

17. A method of customizing a security-sensitive semiconductor product, wherein the method comprises:
supplying a customizable security-sensitive semiconductor product from a product supplier entity to a product recipient entity; and
thereafter, transmitting to the security-sensitive semiconductor product a customizing data structure created by the product supplier entity to customize the supplied security-sensitive semiconductor product in accordance with an application of the supplied semiconductor product specified by the product recipient entity; and
wherein a configuration of the supplied security-sensitive semiconductor product is customized based on the customizing data structure and in accordance with the specified application, wherein the method comprises customizing the configuration by a customizing unit forming part of the semiconductor product.

18. The method according to claim 17, wherein the method comprises customizing the configuration under control of the product supplier entity only.

19. The method according to claim 17, wherein the product supplier entity is located remote from the semiconductor product and remote from the product recipient entity during said customizing.

20. The method according to claim 17, wherein the method comprises customizing the configuration of the security-sensitive semiconductor product at a location of the product recipient entity.

21. The method according to claim 17, wherein the method comprises customizing at least one configuration of the group consisting of a security configuration providing a security personality to the security-sensitive semiconductor product, and an application-specific configuration customized by activating only a subgroup of a plurality of previously deactivated application-specific functional blocks of the security-sensitive semiconductor product.

22. The method according to claim 17, wherein the method comprises:
including a security personality in the customizing data structure; and customizing the supplied security-sensitive semiconductor product in accordance with the customizing data structure only after validation of the included security personality.

23. The method according to claim 17, wherein the method comprises physically shipping the security-sensitive semiconductor product from the product supplier entity to the product recipient entity prior to said customizing.

24. The method according to claim 17, wherein the method comprises customizing the configuration of the supplied security-sensitive semiconductor product via a communications network.

25. The method according to claim 17, wherein the method comprises supplying the semiconductor product in a generic condition being customizable into a specifiable one of a plurality of different specific configurations each assigned to a respective one of different applications of the semiconductor product.

26. The method according to claim 17, wherein the method comprises customizing a security configuration of the supplied semiconductor product by assigning to the semiconductor product at least one of the group consisting of at least one encryption key and at least one authentication key.

27. The method according to claim 17, wherein the method comprises customizing the configuration of the semiconductor product under control of the product supplier entity during further processing of the semiconductor product by the product recipient entity.

28. The method according to claim 17, wherein the method comprises, during or after the customizing, manufacturing original equipment by the product recipient entity based on the customized semiconductor product.

29. The method according to claim 28, wherein the method comprises manufacturing the original equipment in form of at least one of the group consisting of a set top box, a router, a modem, a broadband product, and a television set.

30. The method according to claim 17, wherein the method comprises supplying the customizable security-sensitive semiconductor product in form of a chipset.

31. The method according to claim 17, wherein the method comprises monitoring the customized semiconductor product by the product supplier entity, and, if the monitored customized semiconductor product fails to comply with at least one predefined security criterion, deactivating said semiconductor product.

32. The method according to claim 17, wherein the method comprises re-using security features being permanently deactivated in a customized configuration of the semiconductor product for another semiconductor product to be customized.

33. The method according to claim 17, wherein the method comprises supplying the customizable security-sensitive semiconductor product from the product supplier entity to the product recipient entity with deactivated security features, and activating at least part of said security features upon customizing.

34. The method according to claim 17, wherein the method comprises supplying the customizable security-sensitive semiconductor product from the product supplier entity to the product recipient entity with deactivated functionality features, and activating only part of said functionality features upon customizing.

35. The method according to claim 17, wherein the method comprises generating a report indicative of at least one of the group consisting of semiconductor products being customized, semiconductor products being non-customized, and permanently deactivated security assets of semiconductor products being customized.

36. A method of customizing a security-sensitive semiconductor product, wherein the method comprises:
supplying a customizable security-sensitive semiconductor product from a product supplier entity to a product recipient entity; and
thereafter, transmitting to the security-sensitive semiconductor product a customizing data structure created by the product supplier entity to customize the supplied security-sensitive semiconductor product in accordance with an application of the supplied semiconductor product specified by the product recipient entity; and
wherein a configuration of the supplied security-sensitive semiconductor product is customized based on the customizing data structure and in accordance with the specified application, wherein the configuration is indicative of at least one of the group consisting of an assigned digital rights management configuration of the semiconductor product, and a conditional access configuration of the semiconductor product.

37. The method according to claim 36, wherein the method comprises customizing the configuration by a customizing unit forming part of the semiconductor product.

38. A method of customizing a security-sensitive semiconductor product, wherein the method comprises:
supplying a customizable security-sensitive semiconductor product from a product supplier entity to a product recipient entity; and
thereafter, transmitting to the security-sensitive semiconductor product a customizing data structure created by the product supplier entity to customize the supplied security-sensitive semiconductor product in accordance with an application of the supplied semiconductor product specified by the product recipient entity; and
wherein a configuration of the supplied security-sensitive semiconductor product is customized based on the customizing data structure and in accordance with the specified application, wherein the method comprises providing the customizable semiconductor product with multi-security feature resources allowing the product supplier entity to customize the semiconductor product with at least two different security features by activating at least part of the multi-security feature resources.

39. A method of customizing a security-sensitive semiconductor product, wherein the method comprises:
supplying a customizable security-sensitive semiconductor product by a product supplier entity;
transmitting to the security-sensitive semiconductor product a customizing data structure created by the product supplier entity to customize the supplied security-sensitive semiconductor product in accordance with a specified application of the supplied semiconductor product; and
customizing a configuration of the supplied security-sensitive semiconductor product based on the customizing data structure and in accordance with the specified application, wherein the configuration is indicative of at least one of the group comprising an assigned digital rights management configuration of the semiconductor product, and a conditional access configuration of the semiconductor product.

* * * * *